(12) United States Patent
Wang et al.

(10) Patent No.: US 11,940,601 B2
(45) Date of Patent: Mar. 26, 2024

(54) OPTICAL IMAGING LENS ASSEMBLY

(71) Applicant: Zhejiang Sunny Optical Co., Ltd, Zhejiang Province (CN)

(72) Inventors: Xinquan Wang, Zhejiang Province (CN); Lin Huang, Zhejiang Province (CN)

(73) Assignee: Zhejiang Sunny Optical Co., Ltd, Zhejiang Province (CN)

( * ) Notice: Subject to any disclaimer, the term of this patent is extended or adjusted under 35 U.S.C. 154(b) by 782 days.

(21) Appl. No.: 17/021,399

(22) Filed: Sep. 15, 2020

(65) Prior Publication Data
US 2020/0409121 A1 Dec. 31, 2020

Related U.S. Application Data

(63) Continuation of application No. PCT/CN2019/099389, filed on Aug. 6, 2019.

(30) Foreign Application Priority Data

Nov. 27, 2018 (CN) .......................... 201811423978.3

(51) Int. Cl.
*G02B 9/64* (2006.01)
*G02B 13/00* (2006.01)
*G02B 13/18* (2006.01)

(52) U.S. Cl.
CPC ........... *G02B 13/0045* (2013.01); *G02B 9/64* (2013.01); *G02B 13/18* (2013.01)

(58) Field of Classification Search
CPC ....... G02B 13/0045; G02B 9/64; G02B 13/06
See application file for complete search history.

(56) References Cited

U.S. PATENT DOCUMENTS 10,114,195 B2   10/2018  Son
10,310,226 B2    6/2019  Li
(Continued)

FOREIGN PATENT DOCUMENTS

CN   105974561 A  *  9/2016  ............. G02B 13/00
CN   106154488 A    11/2016
CN   106291882 A     1/2017
(Continued)

OTHER PUBLICATIONS

Translation of CN10594561 (Year: 2016).*
(Continued)

*Primary Examiner* — Alicia M Harrington
(74) *Attorney, Agent, or Firm* — Norris McLaughlin, P.A.

(57) ABSTRACT

The present disclosure discloses an optical imaging lens assembly including, sequentially from an object side to an image side along an optical axis, a first lens, a second lens, a third lens, a fourth lens, a fifth lens, a sixth lens and a seventh lens. The first lens has negative refractive power; the second lens has negative refractive power; the third lens has positive refractive power; the fourth lens has positive refractive power; the fifth lens has refractive power, and an object-side surface thereof is a concave surface; the sixth lens has refractive power; and the seventh lens has negative refractive power. An effective focal length f1 of the first lens and a total effective focal length f of the optical imaging lens assembly satisfy $-3.5<f1/f<0$.

20 Claims, 12 Drawing Sheets

(56) References Cited

U.S. PATENT DOCUMENTS

2017/0108663 A1     4/2017   Sekine
2018/0314036 A1    11/2018   Li

FOREIGN PATENT DOCUMENTS

| CN | 106324797 | A |   | 1/2017 |            |
|----|-----------|---|---|--------|------------|
| CN | 106772951 | A |   | 5/2017 |            |
| CN | 106990510 | A | * | 7/2017 | G02B 13/0045 |
| CN | 108181701 | A |   | 6/2018 |            |
| CN | 109270662 | A |   | 1/2019 |            |
| CN | 209215714 | U |   | 8/2019 |            |

OTHER PUBLICATIONS

Machine Translation of CN106990510 (Year: 2017).*
Examination report issued in corresponding Indian application No. 202017040987 dated Jun. 7, 2021.
International Search Report dated Aug. 20, 2019, in connection with PCT International Application No. PCT/CN2019/099389.
English translation of International Search Report dated Aug. 20, 2019, in connection with PCT International Application No. PCT/CN2019/099389.
Written Opinion dated Oct. 29, 2019, in connection with PCT International Application No. PCT/CN2019/099389.

* cited by examiner

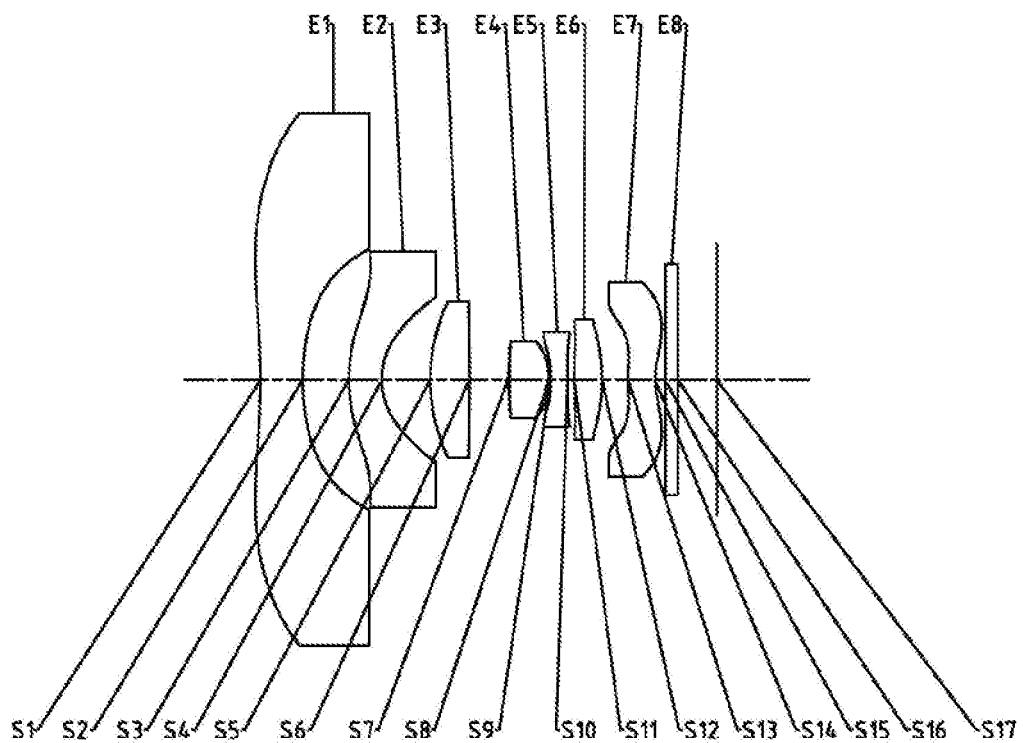
Fig. 5
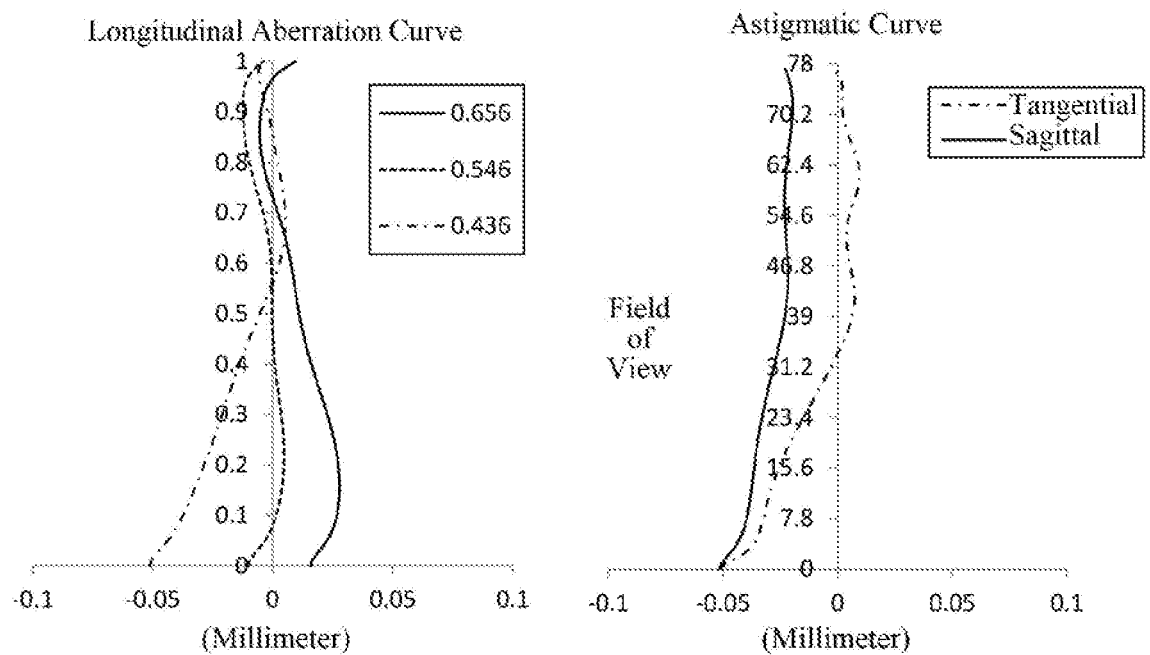
Fig. 6A
Fig. 6B

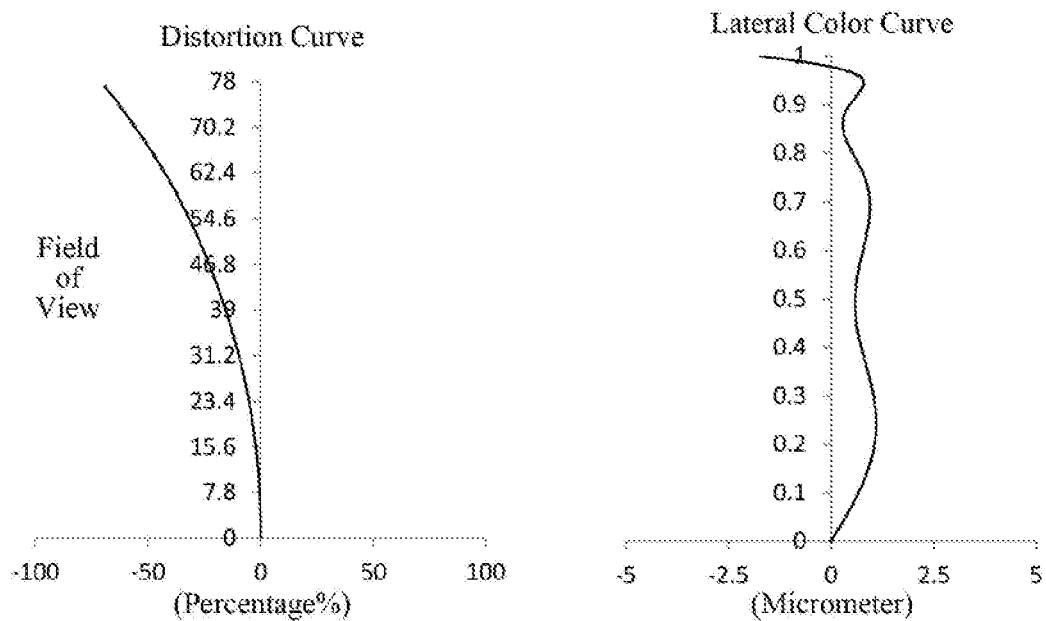
Fig. 6C
Fig. 6D
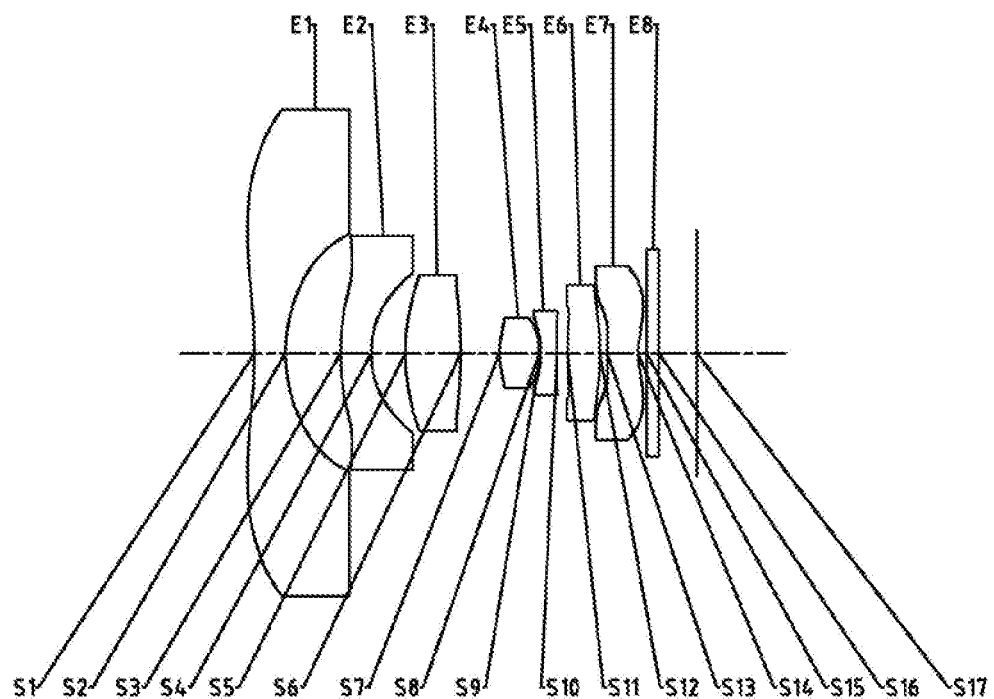
Fig. 7

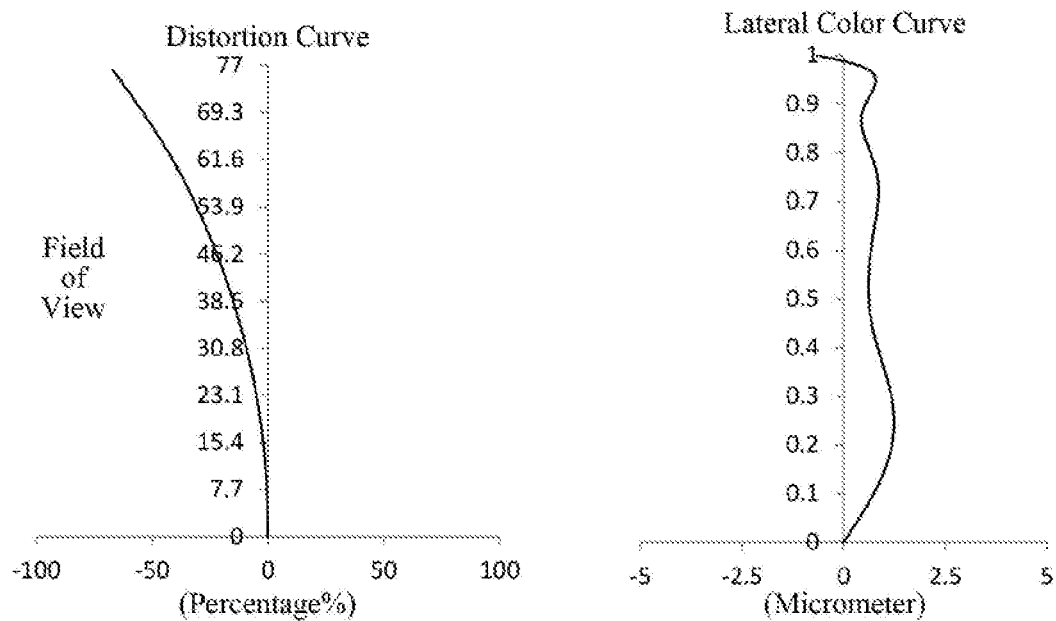
Fig. 10C
Fig. 10D
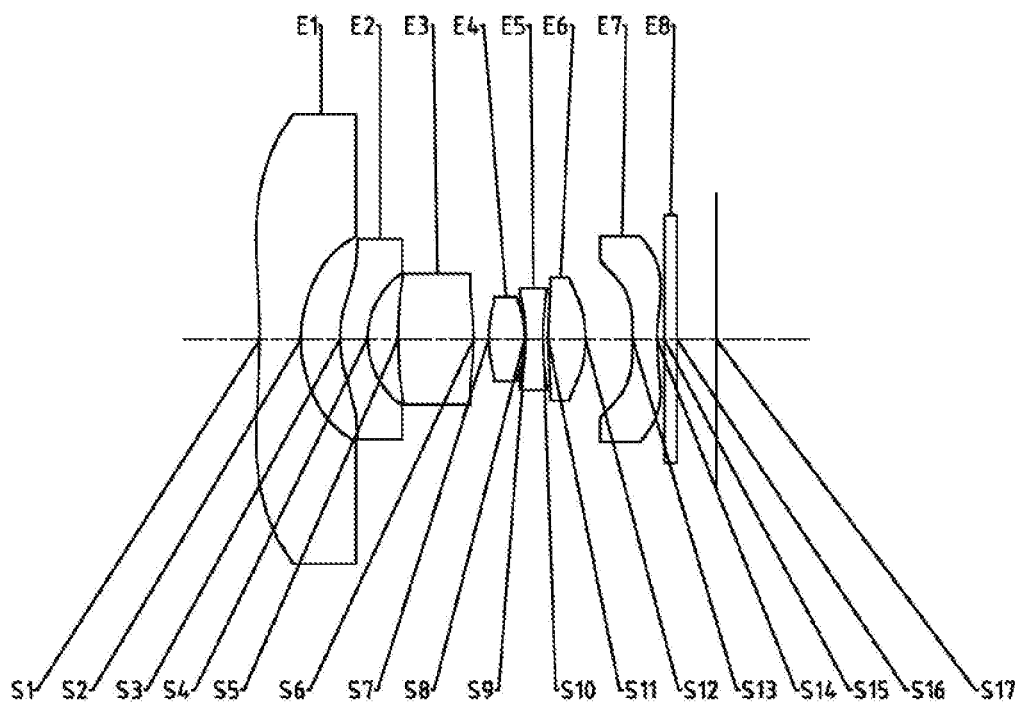
Fig. 11

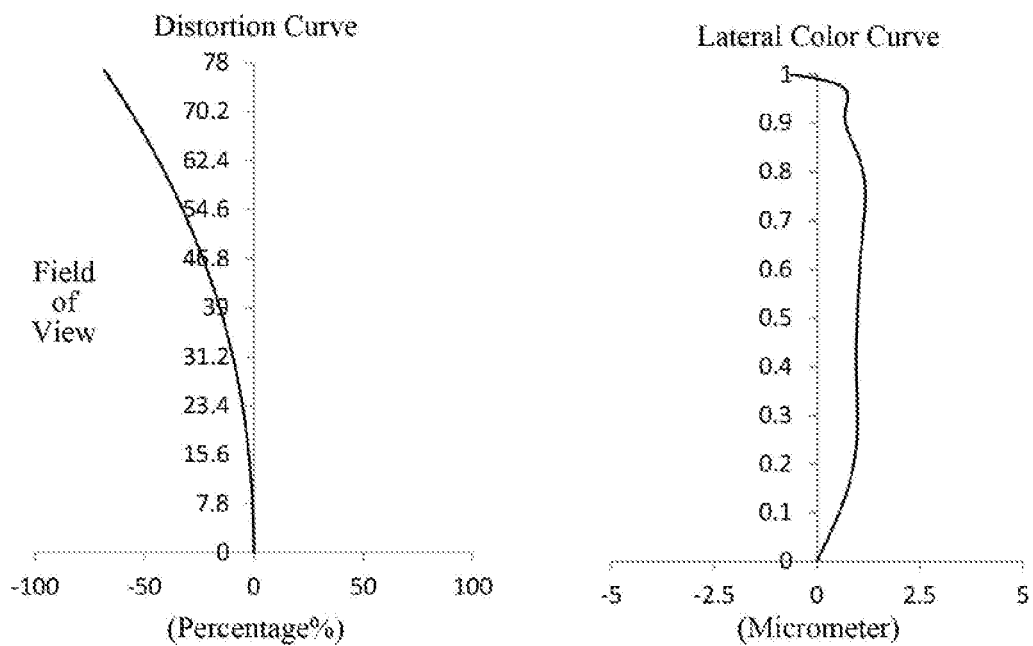
Fig. 14C
Fig. 14D
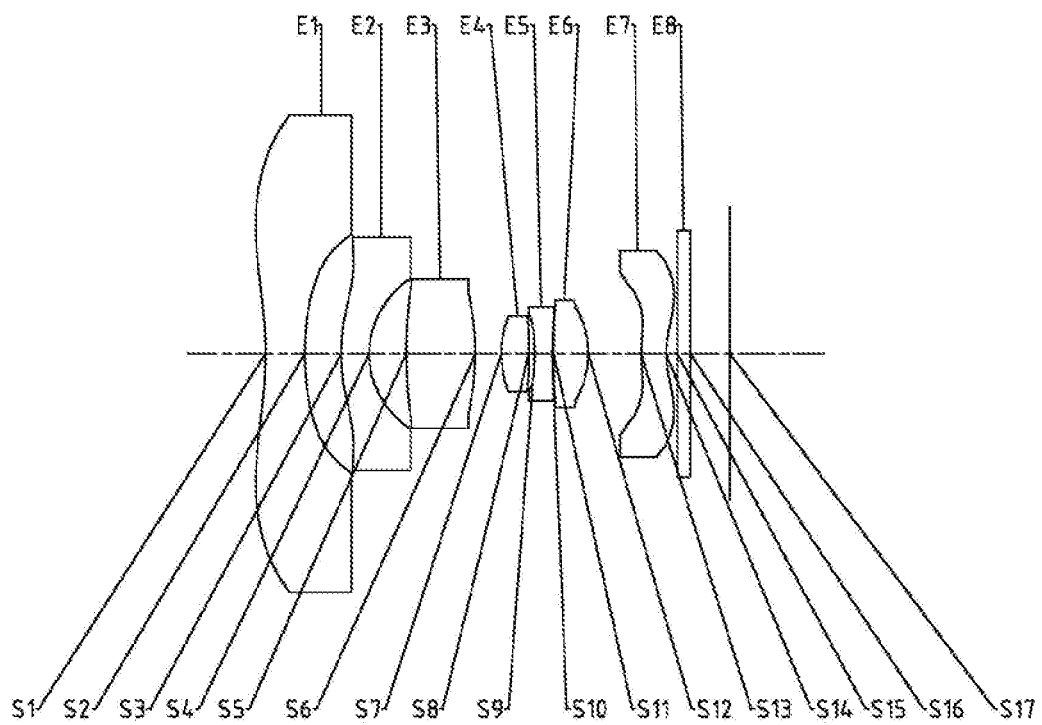
Fig. 15

OPTICAL IMAGING LENS ASSEMBLY

CROSS-REFERENCE TO RELATED APPLICATION

The present patent application is a continuation of International Application No. PCT/CN2019/099389, filed on Aug. 6, 2019, which claims priority to Chinese Patent Application No. 201811423978.3, filed before the China National Intellectual Property Administration (CNIPA) on Nov. 27, 2018. Both of the aforementioned patent applications are hereby incorporated by reference in their entireties.

TECHNICAL FIELD

The present disclosure relates to an optical imaging lens assembly, and more specifically, relates to an optical imaging lens assembly including seven lenses.

BACKGROUND

In recent years, the optical lens assembly equipped with Complementary Metal-Oxide Semiconductor (CMOS) or photosensitive Charge-Coupled Device (CCD) has been widely used in various fields, not only for obtaining images, but also for spatial positioning. The traditional optical lens assembly does not strictly correct the distortion caused by the linear relationship (fθ) between the image height and the half field-of-view, which is not conducive to algorithm processing or anti-distortion correction. Moreover, the traditional optical lens assembly has not optimized the temperature adaptability when the plastic aspheric lenses are employed, so it is difficult for the traditional optical lens assembly to satisfy both good image quality and good temperature adaptability. In addition, the traditional wide-angle lens assembly cannot simultaneously satisfy the requirements of good off-axis image quality and module miniaturization.

SUMMARY

The present disclosure provides an optical imaging lens assembly, such as a wide-angle lens assembly, that is applicable to portable electronic products and at least solves or partially solves at least one of the above disadvantages of the prior art.

In one aspect, the present disclosure provides an optical imaging lens assembly which includes, sequentially from an object side to an image side along an optical axis, a first lens, a second lens, a third lens, a fourth lens, a fifth lens, a sixth lens and a seventh lens. The first lens may have negative refractive power; the second lens may have negative refractive power; the third lens may have positive refractive power; the fourth lens may have positive refractive power; the fifth lens has refractive power, and an object-side surface thereof may be a concave surface; the sixth lens has refractive power; and the seventh lens may have negative refractive power.

In one embodiment, an effective focal length f1 of the first lens and a total effective focal length f of the optical imaging lens assembly may satisfy $-3.5<f1/f<0$.

In one embodiment, a radius of curvature R3 of an object-side surface of the second lens, a radius of curvature R4 of an image-side surface of the second lens and an effective focal length f2 of the second lens may satisfy $0.2<(R3+R4)/|f2|<1.2$.

In one embodiment, an effective focal length f3 of the third lens and an effective focal length f4 of the fourth lens may satisfy $0.3<f4/f3<0.9$.

In one embodiment, a total effective focal length f of the optical imaging lens assembly and a combined focal length f456 of the fourth lens, the fifth lens and the sixth lens may satisfy $0.5<f/f456<1$.

In one embodiment, a total effective focal length f of the optical imaging lens assembly, a radius of curvature R5 of an object-side surface of the third lens and a radius of curvature R7 of an object-side surface of the fourth lens may satisfy $0.9<f/R5+f/R7<1.4$.

In one embodiment, an effective focal length f6 of the sixth lens, a radius of curvature R9 of the object-side surface of the fifth lens and a radius of curvature R12 of an image-side surface of the sixth lens may satisfy $0.3<f6/|(R9+R12)|<0.8$.

In one embodiment, an effective focal length f7 of the seventh lens and a radius of curvature R14 of an image-side surface of the seventh lens may satisfy $-0.6<R14/f7<0$.

In one embodiment, a radius of curvature R1 of an object-side surface of the first lens and a radius of curvature R2 of an image-side surface of the first lens may satisfy $0.2<|R2/R1|<0.8$.

In one embodiment, a spaced interval T23 between the second lens and the third lens along the optical axis and a total effective focal length f of the optical imaging lens assembly may satisfy $0<T23/f<1$.

In one embodiment, a center thickness CT3 of the third lens along the optical axis, a center thickness CT4 of the fourth lens along the optical axis and a center thickness CT6 of the sixth lens along the optical axis may satisfy $0.5<CT3/(CT4+CT6)<1.2$.

In one embodiment, a center thickness CT1 of the first lens along the optical axis, a center thickness CT2 of the second lens along the optical axis, a spaced interval T23 between the second lens and the third lens along the optical axis, an edge thickness ET1 of the first lens and an edge thickness ET2 of the second lens may satisfy $0.7<(CT1+CT2+T23)/(ET1+ET2)<1.2$.

In one embodiment, SAG71, being an on-axis distance from an intersection of an object-side surface of the seventh lens and the optical axis to a vertex of an effective half-aperture of the object-side surface of the seventh lens, and SAG72, being an on-axis distance from an intersection of an image-side surface of the seventh lens and the optical axis to a vertex of an effective half-aperture of the image-side surface of the seventh lens, may satisfy $0<SAG72/SAG71<1$.

In one embodiment, half of a maximal field-of-view semi-FOV of the optical imaging lens assembly, an incident angle CRA of a chief ray on an imaging plane corresponding to half of the maximal field-of-view of the optical imaging lens assembly, a distance TTL along the optical axis from an object-side surface of the first lens to the imaging plane of the optical imaging lens assembly and half of a diagonal length ImgH of an effective pixel area on the imaging plane of the optical imaging lens assembly may satisfy $2.1\ \text{rad}<(\text{semi FOV}-CRA)*TTL/ImgH<2.6\ \text{rad}$.

In another aspect, the present disclosure also provides an optical imaging lens assembly which includes, sequentially from an object side to an image side along an optical axis, a first lens, a second lens, a third lens, a fourth lens, a fifth lens, a sixth lens and a seventh lens. The first lens may have negative refractive power, an object-side surface thereof may be a concave surface; the second lens may have negative refractive power; the third lens may have positive refractive power; the fourth lens may have positive refractive power; the fifth lens has refractive power; the sixth lens has refractive power; and the seventh lens has refractive power, and an image-side surface thereof may be a concave surface.

The present disclosure employs seven lenses, and the above optical imaging lens assembly has at least one beneficial effect, such as miniaturization, wide-angle, and high imaging quality and the like, by rationally configuring the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent from the following detailed description of the non-limiting embodiments with reference to the accompanying drawings. In the drawings:

FIG. 5 illustrates a schematic structural view of an optical imaging lens assembly according to example 3 of the present disclosure; and FIGS. 6A to 6D illustrate a longitudinal aberration curve, an astigmatic curve, a distortion curve, and a lateral color curve of the optical imaging lens assembly of the example 3, respectively.

FIG. 7 illustrates a schematic structural view of an optical imaging lens assembly according to example 4 of the present disclosure.

FIGS. 10A to 10D illustrate a longitudinal aberration curve, an astigmatic curve, a distortion curve, and a lateral color curve of the optical imaging lens assembly of the example 5, respectively.

FIG. 11 illustrates a schematic structural view of an optical imaging lens assembly according to example 6 of the present disclosure.

FIGS. 14A to 14D illustrate a longitudinal aberration curve, an astigmatic curve, a distortion curve, and a lateral color curve of the optical imaging lens assembly of the example 7, respectively.

FIG. 15 illustrates a schematic structural view of an optical imaging lens assembly according to example 8 of the present disclosure.

DETAILED DESCRIPTION OF EMBODIMENTS

Figure 1:
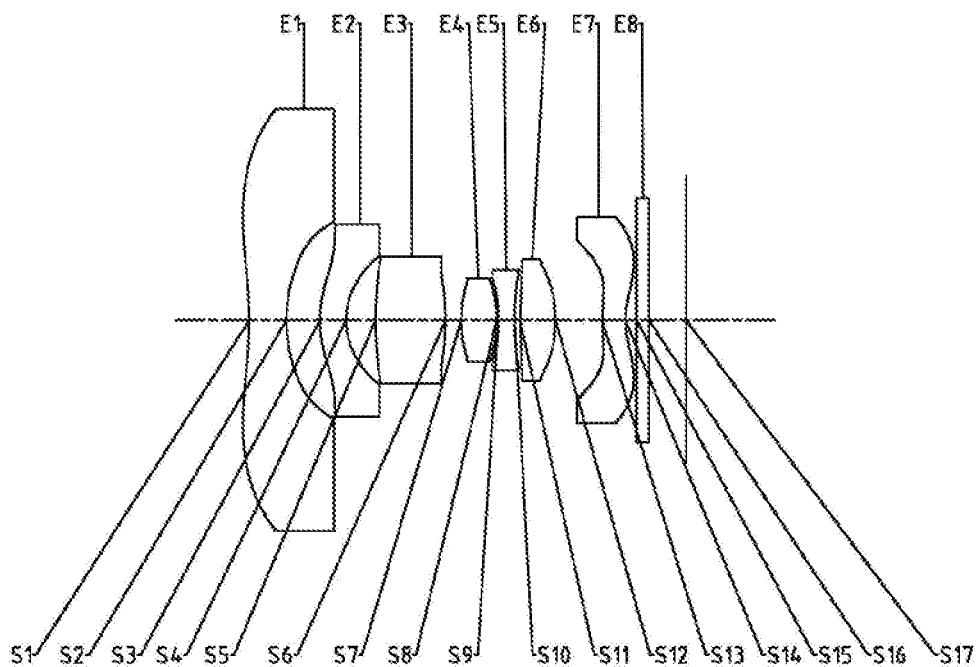
FIG. 1 illustrates a schematic structural view of an optical imaging lens assembly according to example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging lens assembly according to an exemplary embodiment of the present disclosure may include, for example, seven lenses (i.e. a first lens, a second lens, a third lens, a fourth lens, a fifth lens, a sixth lens and a seventh lens) having refractive power. The seven lenses are arranged sequentially from an object side to an image side along an optical axis. Among the first lens to the seventh lens, there may be an air interval between each two adjacent lenses.

In an exemplary embodiment, the first lens may have negative refractive power, an object-side surface thereof may be a concave surface; the second lens may have negative refractive power; the third lens may have positive refractive power; the fourth lens may have positive refractive power; the fifth lens has positive or negative refractive power; the sixth lens has positive or negative refractive power; and the seventh lens has positive or negative refractive power, and an image-side surface thereof may be a concave surface. By configuring the first lens to have negative refractive power and a concave object-side surface, it is beneficial to improve the relative illumination of the off-axis field. By configuring the second lens to have negative refractive power and the third lens to have positive refractive power, it is beneficial to increase the field-of-view. At the same time, it is also beneficial to reduce the incident angle of the light at the position of the stop and reduce pupil aberration, thereby improving the image quality. By configuring the seventh lens to have a concave image-side surface, it is beneficial to shorten the total length of the system, thereby achieving the miniaturization of the lens module.

In an exemplary embodiment, the first lens may have negative refractive power; the second lens may have negative refractive power; the third lens may have positive refractive power; the fourth lens may have positive refractive power; the fifth lens has positive or negative refractive power, and an object-side surface thereof may be a concave surface; the sixth lens has positive or negative refractive power; and the seventh lens may have negative refractive power. By configuring the first lens to have negative refractive power, the second lens to have negative refractive power and the third lens to have positive refractive power, it is beneficial to increase the field-of-view. At the same time, it is also beneficial to reduce the incident angle of the light at the position of the stop and reduce pupil aberration, thereby improving the image quality. By configuring the fourth lens to have positive refractive power, and the fifth lens to have refractive power and a concave object-side surface, it is beneficial to reduce the incident angle of the off-axis light, thereby reducing the tolerance sensitivity of the system. By configuring the seventh lens to have negative refractive power, it is beneficial to disperse the refractive power and shorten the total length of the system, thereby achieving the miniaturization of the lens module.

In an exemplary embodiment, the fifth lens may have negative refractive power.

In an exemplary embodiment, the sixth lens may have positive refractive power.

In an exemplary embodiment, the optical imaging lens assembly according to the present disclosure may satisfy: $-3.5<f1/f<0$, where f1 is an effective focal length of the first lens, and f is a total effective focal length of the optical imaging lens assembly. More specifically, f1 and f may further satisfy: $-3.5<f1/f<-1.5$, for example, $-3.43 \leq f1/f \leq -1.83$. When the conditional expression $-3.5<f1/f<0$ is satisfied and the seventh lens has negative refractive power, it is beneficial to disperse the refractive power and shorten the total length of the system, thereby achieving the miniaturization of the lens module.

In an exemplary embodiment, the optical imaging lens assembly according to the present disclosure may satisfy: $0.2<(R3+R4)/|f2| \leq 1.2$, where R3 is a radius of curvature of an object-side surface of the second lens, R4 is a radius of curvature of an image-side surface of the second lens, and f2 is an effective focal length of the second lens. More specifically, R3, R4 and f2 may further satisfy: $0.31 \leq (R3+R4)/|f2| \leq 1.19$. By controlling this conditional expression within a reasonable range, it is beneficial to disperse the refractive power of the first lens and the second lens. Also, the surface shape of the second lens may effectively controlled, so that the second lens has better processing and molding processability. Optionally, the object-side surface of the second lens may be a convex surface, and the image-side surface thereof may be a concave surface.

In an exemplary embodiment, the optical imaging lens assembly according to the present disclosure may satisfy: $0.3<f4/f3<0.9$, where f3 is an effective focal length of the third lens, and f4 is an effective focal length of the fourth lens. More specifically, f4 and f3 may further satisfy: $0.35 \leq f4/f3 \leq 0.83$. By controlling this conditional expression within a reasonable range, it is beneficial to improve the image quality. At the same time, it is beneficial to reduce the refractive power of the fourth lens and reduce the error sensitivity of product manufacturing.

In an exemplary embodiment, the optical imaging lens assembly according to the present disclosure may satisfy: $0.5<f/f456<1$, where f is a total effective focal length of the optical imaging lens assembly, and f456 is a combined focal length of the fourth lens, the fifth lens and the sixth lens. More specifically, f and f456 may further satisfy: $0.71 \leq f/f456 \leq 0.80$. By controlling this conditional expression within a reasonable range, it is beneficial to shorten the total length of the system, so as to achieve the miniaturization of the lens module. At the same time, the increase of the system tolerance sensitivity caused by excessive concentration of refractive power may be avoided.

In an exemplary embodiment, the optical imaging lens assembly according to the present disclosure may satisfy: $0.9<f/R5+f/R7<1.4$, where f is a total effective focal length of the optical imaging lens assembly, R5 is a radius of curvature of an object-side surface of the third lens, and R7 is a radius of curvature of an object-side surface of the fourth lens. More specifically, f, R5 and R7 may further satisfy: $1.01 \leq f/R5+f/R7 \leq 1.31$. By controlling this conditional expression within a reasonable range, it is beneficial to balance the image quality and reduce the assembly tolerance sensitivity of the third lens and the fourth lens. Optionally, the object-side surface of the third lens may be a convex surface, and the object-side surface of the fourth lens may be a convex surface.

In an exemplary embodiment, the optical imaging lens assembly according to the present disclosure may satisfy: $0.3<f6/|(R9+R12)|<0.8$, where f6 is an effective focal length of the sixth lens, R9 is a radius of curvature of an object-side surface of the fifth lens, and R12 is a radius of curvature of an image-side surface of the sixth lens. More specifically, f6, R9 and R12 may further satisfy: $0.31 \leq f6/|(R9+R12)| \leq 0.72$. By controlling this conditional expression within a reasonable range, it is beneficial to better correct the chromatic aberration, thereby improving the image quality. At the same time, it is beneficial to avoid the increase of the system tolerance sensitivity caused by excessive concentration of reactive power and excessive surface curvature. Optionally, the object-side surface of the fifth lens may be a concave surface, and the image-side surface of the sixth lens may be a convex surface.

In an exemplary embodiment, the optical imaging lens assembly according to the present disclosure may satisfy: $-0.6<R14/f7<0$, where f7 is an effective focal length of the seventh lens, and R14 is a radius of curvature of an image-side surface of the seventh lens. More specifically, R14 and f7 may further satisfy: $-0.6<R14/f7<-0.2$, for example, $-0.55\leq R14/f7\leq -0.22$. By controlling this conditional expression within a reasonable range, it is beneficial to adjust the distribution of the reactive power and shorten the total length of the system, thereby achieving the miniaturization of the lens module and reducing the tolerance sensitivity of the system. Optionally, the object-side surface of the seventh lens may be a concave surface, and the seventh lens may have negative refractive power.

In an exemplary embodiment, the optical imaging lens assembly according to the present disclosure may satisfy: $0.2<|R2/R1|<0.8$, where R1 is a radius of curvature of an object-side surface of the first lens, and R2 is a radius of curvature of an image-side surface of the first lens. More specifically, R2 and R1 may further satisfy: $0.23\leq |R2/R1|\leq 0.79$. By controlling this conditional expression within a reasonable range, it is beneficial to reduce spherical aberration to improve the image quality. Optionally, the object-side surface and the image-side surface of the first lens may be concave surfaces.

In an exemplary embodiment, the optical imaging lens assembly according to the present disclosure may satisfy: $0<T23/f<1$, where T23 is a spaced interval between the second lens and the third lens along the optical axis, and f is a total effective focal length of the optical imaging lens assembly. More specifically, T23 and f may further satisfy: $0.2<T23/f<0.7$, for example, $0.28\leq T23/f\leq 0.57$. By controlling this conditional expression within a reasonable range, it is beneficial to reduce the total length of the system, thereby achieving the miniaturization of the lens module.

In an exemplary embodiment, the optical imaging lens assembly according to the present disclosure may satisfy: $0.5<CT3/(CT4+CT6)<1.2$, where CT3 is a center thickness of the third lens along the optical axis, CT4 is a center thickness of the fourth lens along the optical axis, and CT6 is a center thickness of the sixth lens along the optical axis. More specifically, CT3, CT4 and CT5 may further satisfy: $0.57\leq CT3/(CT4+CT6)\leq 1.11$. By controlling this conditional expression within a reasonable range, it is beneficial to miniaturize the lens module, increase the flange size of the third lens and reasonably control the relationship therebetween, thereby achieving assembly from the same direction.

In an exemplary embodiment, the optical imaging lens assembly according to the present disclosure may satisfy: $0.7<(CT1+CT2+T23)/(ET1+ET2)<1.2$, where CT1 is a center thickness of the first lens along the optical axis, CT2 is a center thickness of the second lens along the optical axis, T23 is a spaced interval between the second lens and the third lens along the optical axis, ET1 is an edge thickness of the first lens, and ET2 is an edge thickness of the second lens. More specifically, CT1, CT2, T23, ET1 and ET2 may further satisfy: $0.85\leq (CT1+CT2+T23)/(ET1+ET2)\leq 1.00$. By controlling this conditional expression within a reasonable range, it is beneficial to improve the processing technology of the first lens and the second lens, so as to reduce the difficulty of molding and manufacturing.

In an exemplary embodiment, the optical imaging lens assembly according to the present disclosure may satisfy: $0<SAG72/SAG71<1$, where SAG71 is an on-axis distance from an intersection of an object-side surface of the seventh lens and the optical axis to a vertex of an effective half-aperture of the object-side surface of the seventh lens, and SAG72 is an on-axis distance from an intersection of an image-side surface of the seventh lens and the optical axis to a vertex of an effective half-aperture of the image-side surface of the seventh lens. More specifically, SAG72 and SAG71 may further satisfy: $0.3<SAG72/SAG71<0.9$, for example, $0.39\leq SAG72/SAG71\leq 0.85$. By controlling this conditional expression within a reasonable range, it is beneficial to better balance the relationship between the miniaturization of the lens module and the increase of the relative illumination of the off-axis field.

In an exemplary embodiment, the optical imaging lens assembly according to the present disclosure may satisfy: $2.1 \text{ rad}<(\text{semi FOV}-\text{CRA})*TTL/ImgH<2.6 \text{ rad}$, where semi-FOV is half of a maximal field-of-view of the optical imaging lens assembly, CRA is an incident angle of the chief ray on an imaging plane corresponding to half of the maximal field-of-view of the optical imaging lens assembly, TTL is a distance along the optical axis from an object-side surface of the first lens to the imaging plane of the optical imaging lens assembly, and ImgH is half of a diagonal length of an effective pixel area on the imaging plane of the optical imaging lens assembly. More specifically, semi FOV, CRA, TTL and ImgH may further satisfy: $2.25 \text{ rad}\leq (\text{semi FOV}-\text{CRA})*TTL/ImgH\leq 2.58 \text{ rad}$. By controlling this conditional expression within a reasonable range, it is beneficial to achieve the miniaturization of the lens module and optimize the wide-angle characteristics of the lens assembly.

In an exemplary embodiment, the above optical imaging lens assembly may further include a stop to improve the image quality of the lens assembly. Optionally, the stop may be disposed between the third lens and the fourth lens.

Optionally, the above optical imaging lens assembly may further include an optical filter for correcting the color deviation and/or a protective glass for protecting the photosensitive element located on an imaging plane.

The optical imaging lens assembly according to the above embodiments of the present disclosure may employ a plurality of lenses, such as seven lenses as described above. By properly configuring the refractive power of each lens, the surface shape, the center thickness of each lens, and spaced intervals along the optical axis between the lenses, the size and the sensitivity of the lens assembly may be effectively reduced, and the workability of the lens assembly may be improved, such that the optical imaging lens assembly is more advantageous for production processing and may be applied to portable electronic products. The optical imaging lens assembly configured as described above may also have beneficial effects such as miniaturization, wide-angle, high image quality, and the like. In addition, the optical imaging lens assembly according to the present disclosure has good performance in eliminating temperature drift, and may ensure the off-axis imaging quality of the lens assembly while meeting the requirements of miniaturization of the module.

In the embodiments of the present disclosure, most lenses in the present disclosure are aspheric lenses, for example, at least one of the object-side surface and the image-side surface of each of the first lens, the second lens, the fourth lens, the fifth lens, the sixth lens and the seventh lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, the object-side surface and the image-side surface of each of the first lens, the second lens, the fourth lens, the fifth lens, the sixth lens and the seventh lens are aspheric.

However, it will be understood by those skilled in the art that the number of lenses constituting the optical imaging lens assembly may be varied to achieve the various results and advantages described in this specification without departing from the technical solution claimed by the present disclosure. For example, although the embodiment is described by taking seven lenses as an example, the optical imaging lens assembly is not limited to include seven lenses. The optical imaging lens assembly may also include other numbers of lenses if desired.

Some specific examples of an optical imaging lens assembly applicable to the above embodiment will be further described below with reference to the accompanying drawings.

Example 1

An optical imaging lens assembly according to example 1 of the present disclosure is described below with reference to FIG. 1 to FIG. 2D. FIG. 1 shows a schematic structural view of the optical imaging lens assembly according to example 1 of the present disclosure.

As shown in FIG. 1, the optical imaging lens assembly according to an exemplary embodiment of the present disclosure includes a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has negative refractive power, an object-side surface S1 thereof is a concave surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a concave surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a convex surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Optionally, a stop STO may be disposed between the third lens E3 and the fourth lens E4 to further improve the image quality.

Table 1 shows surface type, radius of curvature, thickness, material and conic coefficient of each lens of the optical imaging lens assembly in example 1, wherein the units for the radius of curvature and the thickness are millimeter (mm).

TABLE 1

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| S1 | Aspheric | −6.4403 | 0.6388 | 1.54 | 55.7 | 0.0000 |
| S2 | Aspheric | 2.7571 | 0.5714 | | | −1.2244 |
| S3 | Aspheric | 2.0690 | 0.4500 | 1.54 | 55.7 | −2.0805 |
| S4 | Aspheric | 1.3225 | 0.5080 | | | 0.2971 |
| S5 | Spherical | 7.0921 | 1.2013 | 1.73 | 28.3 | 0.0000 |
| S6 | Spherical | −4.7195 | 0.2708 | | | 0.0000 |
| STO | Spherical | Infinite | 0.0000 | | | |
| S7 | Aspheric | 2.4002 | 0.6086 | 1.55 | 56.1 | 0.6842 |
| S8 | Aspheric | −2.2709 | 0.0250 | | | 2.7200 |
| S9 | Aspheric | −3.6774 | 0.2800 | 1.68 | 19.2 | 19.6304 |
| S10 | Aspheric | 4.8633 | 0.0929 | | | 4.1924 |
| S11 | Aspheric | 5.6251 | 0.6097 | 1.55 | 56.1 | −48.5457 |
| S12 | Aspheric | −2.4363 | 0.7994 | | | 2.6585 |
| S13 | Aspheric | 2.6112 | 0.4000 | 1.54 | 55.7 | −33.1580 |
| S14 | Aspheric | 1.2692 | 0.1940 | | | −0.5446 |
| S15 | Spherical | Infinite | 0.2100 | 1.52 | 64.2 | |
| S16 | Spherical | Infinite | 0.6400 | | | |
| S17 | Spherical | Infinite | | | | |

As can be seen from Table 1, the object-side surface and the image-side surface of each of the first lens E1, the second lens E2, the fourth lens E4, the fifth lens E5, the sixth lens E6, and the seventh lens E7 are aspheric; and the object-side surface and the image-side surface of the third lens E3 are spherical. In this example, the surface shape x of each aspheric lens may be defined by using, but not limited to, the following aspheric formula:

$$x = \frac{ch^2}{1+\sqrt{1-(k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient (given in the above Table 1); Ai is a correction coefficient for the i-th order of the aspheric surface. Table 2 below shows high-order coefficients A4, A6, A8, A10, A12, A14 and A16 applicable to each aspheric surface S1 to S4 and S7 to S14 in example 1.

TABLE 2

| Surface number | A4 | A6 | A8 | A10 | A12 | A14 | A16 |
|---|---|---|---|---|---|---|---|
| S1 | 1.6560E−02 | −1.0029E−03 | 3.8036E−05 | −3.8498E−07 | 0.0000E+00 | 0.0000E+00 | 0.0000E+00 |
| S2 | 1.2301E−02 | −5.2646E−03 | 4.8604E−03 | 0.0000E+00 | 0.0000E+00 | 0.0000E+00 | 0.0000E+00 |
| S3 | 4.3660E−02 | −1.0076E−01 | 3.7029E−02 | −4.2375E−03 | 0.0000E+00 | 0.0000E+00 | 0.0000E+00 |
| S4 | 6.4021E−02 | −1.2946E−01 | 1.8027E−01 | 6.5573E−03 | 0.0000E+00 | 0.0000E+00 | 0.0000E+00 |
| S7 | 1.0238E−02 | 3.7818E−01 | −2.8986E+00 | 1.2841E+01 | −3.1541E+01 | 3.9751E+01 | −1.9845E+01 |
| S8 | 4.1137E−01 | −4.9259E+00 | 2.3934E+01 | −6.3720E+01 | 9.6872E+01 | −7.7753E+01 | 2.5202E+01 |
| S9 | 4.2428E−01 | −4.9278E+00 | 2.2351E+01 | −5.6158E+01 | 8.2520E+01 | −6.5932E+01 | 2.2830E+01 |
| S10 | 1.6383E−01 | −1.2763E+00 | 3.7210E+00 | −5.9050E+00 | 5.4102E+00 | −2.5982E+00 | 4.8707E−01 |
| S11 | 2.4317E−02 | −3.1371E−01 | 4.7749E−01 | −2.2115E−01 | 0.0000E+00 | 0.0000E+00 | 0.0000E+00 |
| S12 | −7.6590E−02 | 1.0314E−01 | −4.9285E−03 | −2.1554E−01 | 3.5890E−01 | −1.9459E−01 | 3.0888E−02 |
| S13 | −2.4979E−01 | −1.5644E−01 | 4.6550E−01 | −4.9006E−01 | 2.7069E−01 | −7.6126E−02 | 8.8543E−03 |
| S14 | −4.9614E−01 | 3.7447E−01 | −2.5554E−01 | 1.2196E−01 | −3.8618E−02 | 7.0676E−03 | −5.6701E−04 |

Table 3 shows effective focal lengths f1 to f7 of respective lens, a total effective focal length f of the optical imaging lens assembly, a total optical length TTL (i.e., the distance along the optical axis from the object-side surface S1 of the first lens E1 to the imaging plane S17), half of a diagonal length ImgH of an effective pixel area on the imaging plane S17, half of a maximal field-of-view semi-FOV, and an aperture number f/EPD in example 1.

TABLE 3

| | |
|---|---|
| f1 (mm) | −3.51 |
| f2 (mm) | −3.55 |
| f3 (mm) | 6.43 |
| f4 (mm) | 2.24 |
| f5 (mm) | −3.04 |
| f6 (mm) | 3.20 |
| f7 (mm) | −5.13 |
| f (mm) | 1.81 |
| TTL (mm) | 7.50 |
| ImgH (mm) | 2.47 |
| semi-FOV (°) | 77.5 |
| f/EPD | 2.60 |

Figures 2A, 2B:
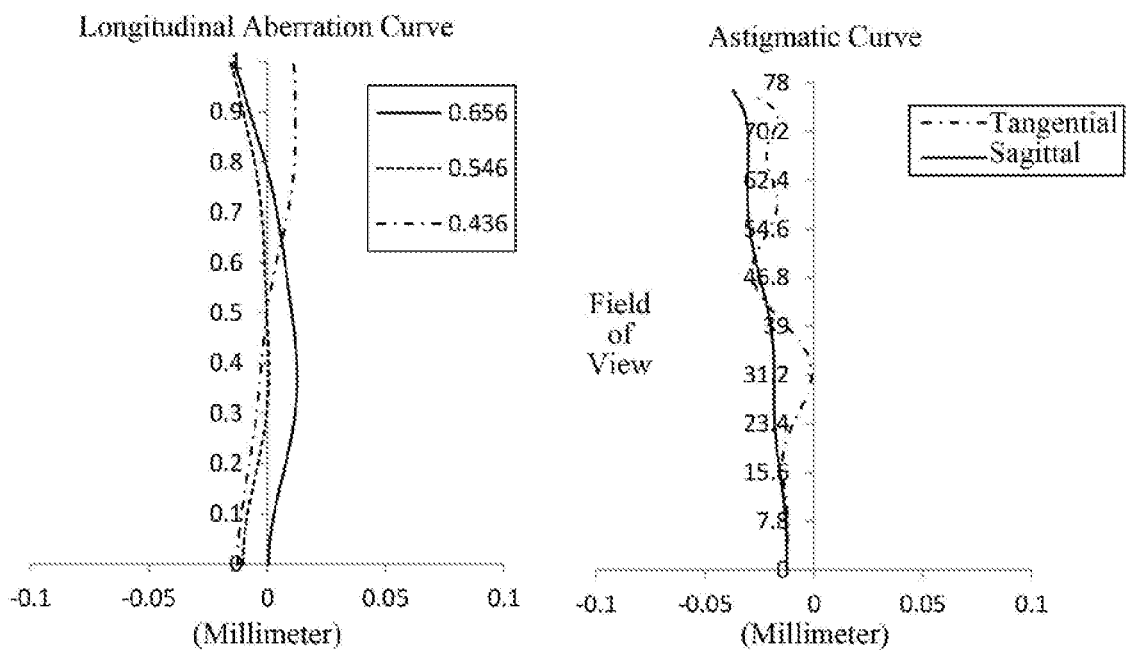
FIGS. 2A to 2D illustrate a longitudinal aberration curve, an astigmatic curve, a distortion curve, and a lateral color curve of the optical imaging lens assembly of the example 1, respectively.
Figures 2C, 2D:
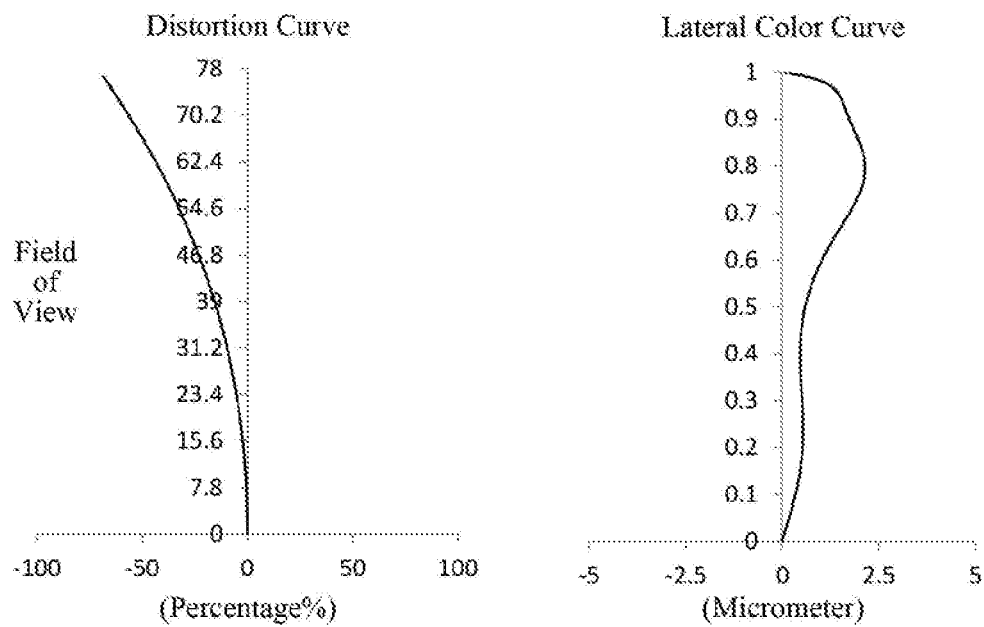

FIG. 2A illustrates a longitudinal aberration curve of the optical imaging lens assembly according to example 1, representing deviations of focal points converged by light of different wavelengths after passing through the lens assembly. FIG. 2B illustrates an astigmatic curve of the optical imaging lens assembly according to example 1, representing a curvature of a tangential plane and a curvature of a sagittal plane. FIG. 2C illustrates a distortion curve of the optical imaging lens assembly according to example 1, representing amounts of distortion corresponding to different field-of-views. FIG. 2D illustrates a lateral color curve of the optical imaging lens assembly according to example 1, representing deviations of different image heights on an imaging plane after light passes through the lens assembly. It can be seen from FIG. 2A to FIG. 2D that the optical imaging lens assembly provided in example 1 may achieve good image quality.

Example 2

Figure 3:
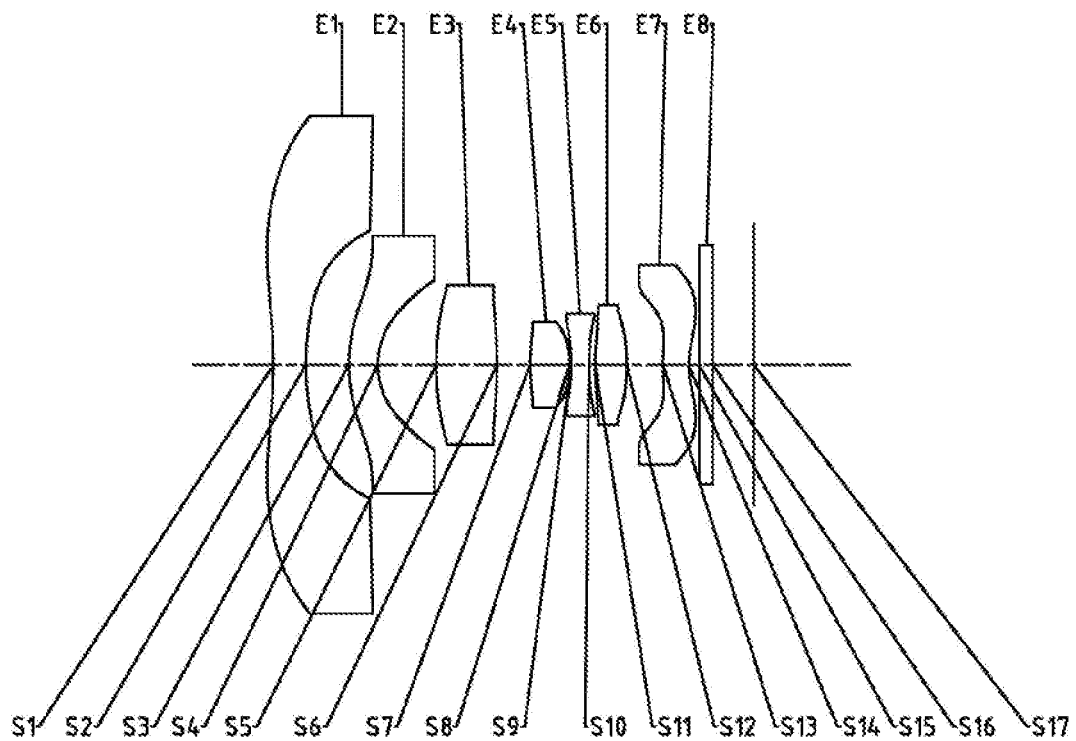
FIG. 3 illustrates a schematic structural view of an optical imaging lens assembly according to example 2 of the present disclosure.

An optical imaging lens assembly according to example 2 of the present disclosure is described below with reference to FIG. 3 to FIG. 4D. In this example and the following examples, for the purpose of brevity, the description of parts similar to those in example 1 will be omitted. FIG. 3 shows a schematic structural view of the optical imaging lens assembly according to example 2 of the present disclosure.

As shown in FIG. 3, the optical imaging lens assembly according to an exemplary embodiment of the present disclosure includes a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has negative refractive power, an object-side surface S1 thereof is a concave surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a concave surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a convex surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Optionally, a stop STO may be disposed between the third lens E3 and the fourth lens E4 to further improve the image quality.

Table 4 shows surface type, radius of curvature, thickness, material, and conic coefficient of each lens of the optical imaging lens assembly in example 2, wherein the units for the radius of curvature and the thickness are millimeter (mm).

TABLE 4

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| S1 | Aspheric | −7.1556 | 0.5030 | 1.54 | 55.7 | 0.0000 |
| S2 | Aspheric | 5.1071 | 0.6712 | | | 0.9101 |
| S3 | Aspheric | 2.8006 | 0.4514 | 1.54 | 55.7 | −1.3163 |
| S4 | Aspheric | 1.2872 | 0.9123 | | | −0.2740 |
| S5 | Spherical | 4.7420 | 0.9516 | 1.73 | 28.3 | 0.0000 |
| S6 | Spherical | −9.6752 | 0.5166 | | | 0.0000 |
| STO | Spherical | Infinite | 0.0000 | | | |
| S7 | Aspheric | 2.4771 | 0.6186 | 1.55 | 56.1 | −21.6791 |
| S8 | Aspheric | −2.0825 | 0.0250 | | | 4.4615 |
| S9 | Aspheric | −5.9454 | 0.2800 | 1.68 | 19.2 | 43.7313 |
| S10 | Aspheric | 4.0195 | 0.0925 | | | −57.1036 |
| S11 | Aspheric | 2.9686 | 0.4973 | 1.55 | 56.1 | −48.7334 |
| S12 | Aspheric | −3.9025 | 0.5636 | | | 7.6586 |
| S13 | Aspheric | 2.5936 | 0.4000 | 1.54 | 55.7 | −33.0938 |
| S14 | Aspheric | 1.1336 | 0.1669 | | | −0.5362 |
| S15 | Spherical | Infinite | 0.2100 | 1.52 | 64.2 | |
| S16 | Spherical | Infinite | 0.6400 | | | |
| S17 | Spherical | Infinite | | | | |

As can be seen from Table 4, in example 2, the object-side surface and the image-side surface of each of the first lens E1, the second lens E2, the fourth lens E4, the fifth lens E5, the sixth lens E6, and the seventh lens E7 are aspheric; and the object-side surface and the image-side surface of the third lens E3 are spherical. Table 5 shows high-order coefficients applicable to each aspheric surface in example 2, wherein the surface shape of each aspheric surface may be defined by the formula (1) given in the above example 1.

TABLE 5

| Surface number | A4 | A6 | A8 | A10 | A12 | A14 | A16 |
|---|---|---|---|---|---|---|---|
| S1 | 1.4649E−02 | −8.9635E−04 | 3.3009E−05 | −4.0556E−07 | 0.0000E+00 | 0.0000E+00 | 0.0000E+00 |
| S2 | 1.0704E−02 | 6.3441E−04 | 5.1263E−04 | 0.0000E+00 | 0.0000E+00 | 0.0000E+00 | 0.0000E+00 |
| S3 | 3.8050E−02 | −3.7217E−02 | 7.8241E−03 | −5.3307E−04 | 0.0000E+00 | 0.0000E+00 | 0.0000E+00 |
| S4 | 7.3138E−02 | −3.5388E−02 | −2.6454E−02 | 8.6305E−03 | 0.0000E+00 | 0.0000E+00 | 0.0000E+00 |
| S7 | 2.8202E−02 | 1.8787E−01 | −7.4760E+00 | 4.5975E+01 | −1.6307E+02 | 2.9983E+02 | −2.3539E+02 |
| S8 | −5.7844E−01 | −6.9823E−01 | 1.4606E+01 | −6.6357E+01 | 1.4870E+02 | −1.7063E+02 | 7.8081E+01 |
| S9 | −3.1518E−01 | −9.5931E−01 | 1.3985E+01 | −5.6141E+01 | 1.1669E+02 | −1.2625E+02 | 5.6130E+01 |
| S10 | 1.0230E−01 | −6.3023E−01 | 3.1015E+00 | −7.2856E+00 | 9.9071E+00 | −7.5936E+00 | 2.4839E+00 |
| S11 | −1.8199E−02 | −2.4063E−01 | 3.4845E−01 | −9.1264E−02 | 0.0000E+00 | 0.0000E+00 | 0.0000E+00 |
| S12 | −1.5648E−01 | 3.5121E−01 | −7.3299E−01 | 9.6070E−01 | −7.1893E−01 | 3.9727E−01 | −7.6733E−02 |
| S13 | −4.7862E−01 | −9.5667E−02 | 1.0771E+00 | −1.8335E+00 | 1.4897E+00 | −5.6898E−01 | 8.2315E−02 |
| S14 | −7.6124E−01 | 7.7023E−01 | −6.7949E−01 | 4.1116E−01 | −1.6382E−01 | 3.7974E−02 | −3.8958E−03 |

Table 6 shows effective focal lengths f1 to f7 of respective lens, a total effective focal length f of the optical imaging lens assembly, a total optical length TTL (i.e., the distance along the optical axis from the object-side surface S1 of the first lens E1 to the imaging plane S17), half of a diagonal length ImgH of an effective pixel area on the imaging plane S17, half of a maximal field-of-view semi-FOV, and an aperture number f/EPD in example 2.

TABLE 6

| f1 (mm) | −5.47 |
|---|---|
| f2 (mm) | −4.95 |
| f3 (mm) | 4.46 |
| f4 (mm) | 2.17 |
| f5 (mm) | −3.49 |
| f6 (mm) | 3.17 |
| f7 (mm) | −4.15 |
| f (mm) | 1.64 |

TABLE 6-continued

| TTL (mm) | 7.50 |
|---|---|
| ImgH (mm) | 2.25 |
| semi-FOV (°) | 77.5 |
| f/EPD | 2.60 |

Figure 4A:
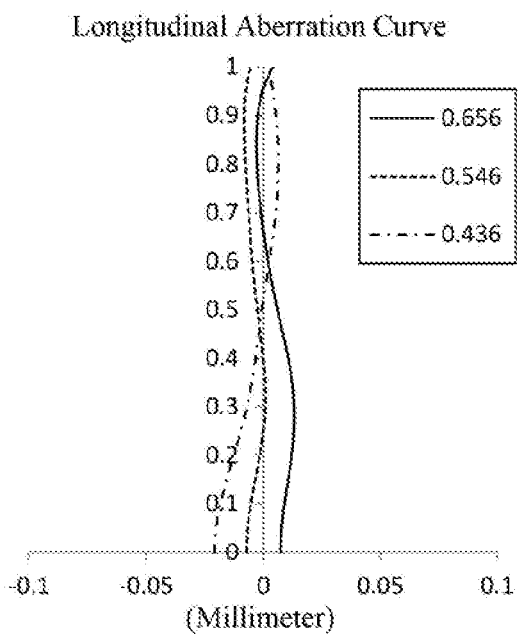
FIGS. 4A to 4D illustrate a longitudinal aberration curve, an astigmatic curve, a distortion curve, and a lateral color curve of the optical imaging lens assembly of the example 2, respectively.
Figure 4B:
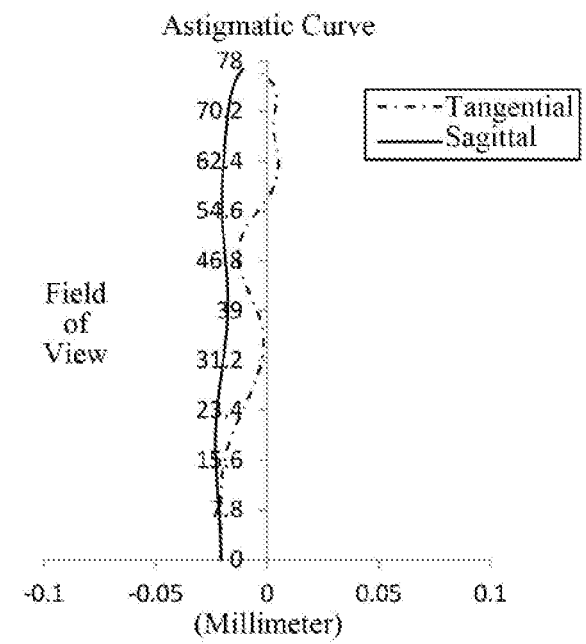
Figure 4C:
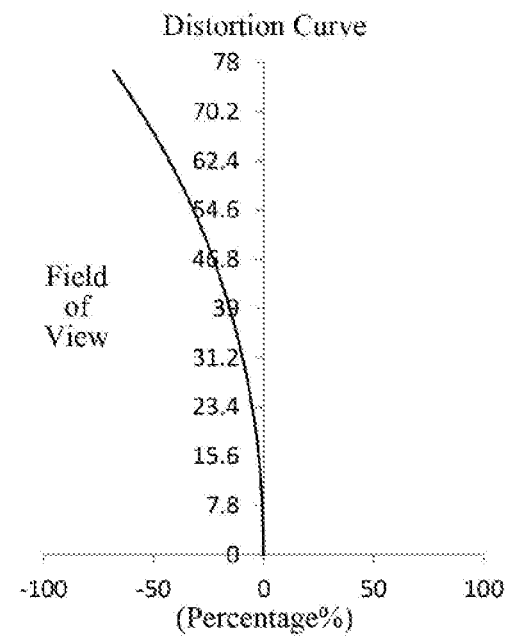
Figure 4D:
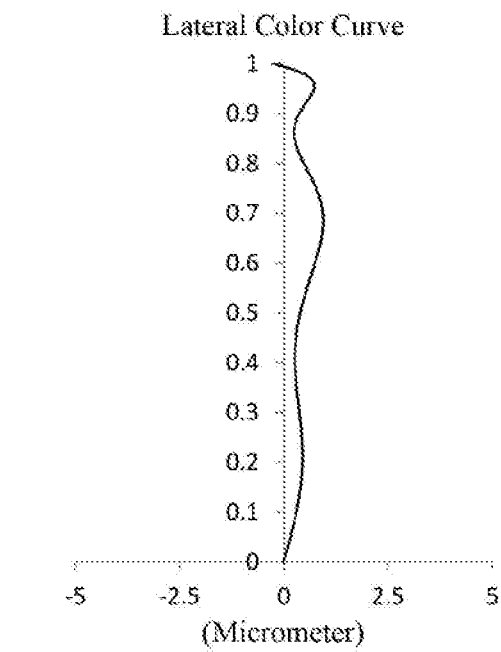

FIG. 4A illustrates a longitudinal aberration curve of the optical imaging lens assembly according to example 2, representing deviations of focal points converged by light of different wavelengths after passing through the lens assembly. FIG. 4B illustrates an astigmatic curve of the optical imaging lens assembly according to example 2, representing a curvature of a tangential plane and a curvature of a sagittal plane. FIG. 4C illustrates a distortion curve of the optical imaging lens assembly according to example 2, representing amounts of distortion corresponding to different field-of-views. FIG. 4D illustrates a lateral color curve of the optical imaging lens assembly according to example 2, representing deviations of different image heights on an imaging plane after light passes through the lens assembly. It can be seen from FIG. 4A to FIG. 4D that the optical imaging lens assembly provided in example 2 may achieve good image quality.

Example 3

An optical imaging lens assembly according to example 3 of the present disclosure is described below with reference to FIG. 5 to FIG. 6D. FIG. 5 shows a schematic structural view of the optical imaging lens assembly according to example 3 of the present disclosure.

As shown in FIG. 5, the optical imaging lens assembly according to an exemplary embodiment of the present disclosure includes a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has negative refractive power, an object-side surface S1 thereof is a concave surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a concave surface, and an image-side surface S10 thereof is a convex surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a convex surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Optionally, a stop STO may be disposed between the third lens E3 and the fourth lens E4 to further improve the image quality.

Table 7 shows surface type, radius of curvature, thickness, material and conic coefficient of each lens of the optical imaging lens assembly in example 3, wherein the units for the radius of curvature and the thickness are millimeter (mm).

TABLE 7

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| S1 | Aspheric | −9.3805 | 0.6900 | 1.54 | 55.7 | 0.0000 |
| S2 | Aspheric | 3.9849 | 0.7608 | | | −3.1361 |
| S3 | Aspheric | 2.9721 | 0.5419 | 1.54 | 55.7 | −0.5490 |
| S4 | Aspheric | 1.2448 | 0.7981 | | | −0.4462 |
| S5 | Spherical | 3.0009 | 0.6461 | 1.73 | 28.3 | 0.0000 |
| S6 | Spherical | −49.2211 | 0.6605 | | | 0.0000 |
| STO | Spherical | Infinite | −0.0251 | | | |
| S7 | Aspheric | 2.4184 | 0.6696 | 1.55 | 56.1 | −13.2800 |
| S8 | Aspheric | −1.7984 | 0.0250 | | | 4.8292 |
| S9 | Aspheric | −3.7786 | 0.2800 | 1.68 | 19.2 | 26.9557 |
| S10 | Aspheric | −205.8949 | 0.1084 | | | −142624440.4584 |
| S11 | Aspheric | 8.0598 | 0.4565 | 1.55 | 56.1 | −48.7202 |
| S12 | Aspheric | −4.3735 | 0.4299 | | | −10.0147 |
| S13 | Aspheric | 2.5643 | 0.4425 | 1.54 | 55.7 | −32.7403 |
| S14 | Aspheric | 1.1278 | 0.1657 | | | −0.5527 |
| S15 | Spherical | Infinite | 0.2100 | 1.52 | 64.2 | |
| S16 | Spherical | Infinite | 0.6400 | | | |
| S17 | Spherical | Infinite | | | | |

As can be seen from Table 7, in example 3, the object-side surface and the image-side surface of each of the first lens E1, the second lens E2, the fourth lens E4, the fifth lens E5, the sixth lens E6, and the seventh lens E7 are aspheric; and the object-side surface and the image-side surface of the third lens E3 are spherical. Table 8 shows high-order coefficients applicable to each aspheric surface in example 3, wherein the surface shape of each aspheric surface may be defined by the formula (1) given in the above example 1.

TABLE 8

| Surface number | A4 | A6 | A8 | A10 | A12 | A14 | A16 |
|---|---|---|---|---|---|---|---|
| S1 | 9.4135E−03 | −4.7063E−04 | 1.4499E−05 | −1.4538E−07 | 0.0000E+00 | 0.0000E+00 | 0.0000E+00 |
| S2 | 1.9737E−02 | −1.2855E−03 | 6.6404E−04 | 0.0000E+00 | 0.0000E+00 | 0.0000E+00 | 0.0000E+00 |
| S3 | 3.5862E−02 | −3.5660E−02 | 7.1429E−03 | −4.6674E−04 | 0.0000E+00 | 0.0000E+00 | 0.0000E+00 |
| S4 | 7.5168E−02 | −3.5972E−02 | −2.6123E−02 | 1.0510E−02 | 0.0000E+00 | 0.0000E+00 | 0.0000E+00 |
| S7 | −8.1683E−02 | 1.1106E+00 | −1.9622E+01 | 1.3685E+02 | −5.5470E+02 | 1.1793E+03 | −1.0562E+03 |
| S8 | −1.6890E+00 | 9.0594E+00 | −3.5112E+01 | 1.0222E+02 | −2.1968E+02 | 3.0123E+02 | −1.8956E+02 |
| S9 | −1.1527E+00 | 5.6214E+00 | −1.3807E+01 | 1.7944E+01 | −3.2134E−01 | −2.7636E+01 | 2.4901E+01 |
| S10 | 2.4369E−01 | −1.3244E+00 | 4.9208E+00 | −9.5619E+00 | 1.0238E+01 | −4.8944E+00 | 5.6962E−02 |
| S11 | 1.0288E−01 | −6.2900E−01 | 8.5970E−01 | −4.1018E−01 | 0.0000E+00 | 0.0000E+00 | 0.0000E+00 |
| S12 | −1.8816E−01 | 3.1001E−01 | −9.4153E−02 | −1.2404E+00 | 2.7052E+00 | −2.2269E+00 | 6.9344E−01 |

TABLE 8-continued

| Surface number | A4 | A6 | A8 | A10 | A12 | A14 | A16 |
|---|---|---|---|---|---|---|---|
| S13 | −5.1270E−01 | −1.2743E−01 | 1.5191E+00 | −2.6190E+00 | 2.1397E+00 | −8.3467E−01 | 1.2509E−01 |
| S14 | −7.7726E−01 | 7.8521E−01 | −6.5592E−01 | 3.7022E−01 | −1.3772E−01 | 2.9857E−02 | −2.8703E−03 |

Table 9 shows effective focal lengths f1 to f7 of respective lens, a total effective focal length f of the optical imaging lens assembly, a total optical length TTL (i.e., the distance along the optical axis from the object-side surface S1 of the first lens E1 to the imaging plane S17), half of a diagonal length ImgH of an effective pixel area on the imaging plane S17, half of a maximal field-of-view semi-FOV, and an aperture number f/EPD in example 3.

TABLE 9

| | |
|---|---|
| f1 (mm) | −5.11 |
| f2 (mm) | −4.48 |
| f3 (mm) | 3.87 |
| f4 (mm) | 2.00 |
| f5 (mm) | −5.67 |
| f6 (mm) | 5.26 |
| f7 (mm) | −4.20 |
| f (mm) | 1.61 |
| TTL (mm) | 7.50 |
| ImgH (mm) | 2.22 |
| semi-FOV (°) | 78.0 |
| f/EPD | 2.60 |

FIG. 6A illustrates a longitudinal aberration curve of the optical imaging lens assembly according to example 3, representing deviations of focal points converged by light of different wavelengths after passing through the lens assembly. FIG. 6B illustrates an astigmatic curve of the optical imaging lens assembly according to example 3, representing a curvature of a tangential plane and a curvature of a sagittal plane. FIG. 6C illustrates a distortion curve of the optical imaging lens assembly according to example 3, representing amounts of distortion corresponding to different field-of-views. FIG. 6D illustrates a lateral color curve of the optical imaging lens assembly according to example 3, representing deviations of different image heights on an imaging plane after light passes through the lens assembly. It can be seen from FIG. 6A to FIG. 6D that the optical imaging lens assembly provided in example 3 may achieve good image quality.

Example 4

An optical imaging lens assembly according to example 4 of the present disclosure is described below with reference to FIG. 7 to FIG. 8D. FIG. 7 shows a schematic structural view of the optical imaging lens assembly according to example 4 of the present disclosure.

As shown in FIG. 7, the optical imaging lens assembly according to an exemplary embodiment of the present disclosure includes a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has negative refractive power, an object-side surface S1 thereof is a concave surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a concave surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a convex surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Optionally, a stop STO may be disposed between the third lens E3 and the fourth lens E4 to further improve the image quality.

Table 10 shows surface type, radius of curvature, thickness, material and conic coefficient of each lens of the optical imaging lens assembly in example 4, wherein the units for the radius of curvature and the thickness are millimeter (mm).

TABLE 10

| Surface number | Surface type | Radius of curvature | Thickness | Material Refractive index | Material Abbe number | Conic coefficient |
|---|---|---|---|---|---|---|
| OBJ | Spherical | Infinite | Infinite | | | |
| S1 | Aspheric | −8.1338 | 0.5218 | 1.54 | 55.7 | 0.0000 |
| S2 | Aspheric | 2.8505 | 0.9372 | | | −2.3253 |
| S3 | Aspheric | 5.4713 | 0.5235 | 1.54 | 55.7 | −2.2400 |
| S4 | Aspheric | 2.0242 | 0.5724 | | | 0.7211 |
| S5 | Spherical | 3.8081 | 0.9417 | 1.73 | 28.3 | 0.0000 |
| S6 | Spherical | −9.7902 | 0.6837 | | | 0.0000 |
| STO | Spherical | Infinite | −0.0235 | | | |
| S7 | Aspheric | 1.7271 | 0.6696 | 1.55 | 56.1 | 3.0096 |

TABLE 10-continued

| Surface number | Surface type | Radius of curvature | Thickness | Material Refractive index | Abbe number | Conic coefficient |
|---|---|---|---|---|---|---|
| S8 | Aspheric | −3.0347 | 0.0250 | | | −122.2463 |
| S9 | Aspheric | −5.8102 | 0.2800 | 1.68 | 19.2 | 59.7435 |
| S10 | Aspheric | 300.9895 | 0.1770 | | | 166177.5216 |
| S11 | Aspheric | 8.0765 | 0.5482 | 1.55 | 56.1 | −43.4203 |
| S12 | Aspheric | −6.6253 | 0.1272 | | | 21.0446 |
| S13 | Aspheric | 3.3390 | 0.5202 | 1.54 | 55.7 | −32.9651 |
| S14 | Aspheric | 1.2659 | 0.1460 | | | −0.3462 |
| S15 | Spherical | Infinite | 0.2100 | 1.52 | 64.2 | |
| S16 | Spherical | Infinite | 0.6400 | | | |
| S17 | Spherical | Infinite | | | | |

As can be seen from Table 10, in example 4, the object-side surface and the image-side surface of each of the first lens E1, the second lens E2, the fourth lens E4, the fifth lens E5, the sixth lens E6, and the seventh lens E7 are aspheric; and the object-side surface and the image-side surface of the third lens E3 are spherical. Table 11 shows high-order coefficients applicable to each aspheric surface in example 4, wherein the surface shape of each aspheric surface may be defined by the formula (1) given in the above example 1.

TABLE 11

| Surface number | A4 | A6 | A8 | A10 | A12 | A14 | A16 |
|---|---|---|---|---|---|---|---|
| S1 | 9.3315E−03 | −4.0350E−04 | 1.0843E−05 | −6.2591E−08 | 0.0000E+00 | 0.0000E+00 | 0.0000E+00 |
| S2 | 2.0082E−02 | −5.1038E−03 | 1.4849E−03 | 0.0000E+00 | 0.0000E+00 | 0.0000E+00 | 0.0000E+00 |
| S3 | 6.2901E−02 | −4.7820E−02 | 1.0303E−02 | −7.4433E−04 | 0.0000E+00 | 0.0000E+00 | 0.0000E+00 |
| S4 | 9.7212E−02 | −2.6718E−02 | −2.8598E−02 | 1.0575E−02 | 0.0000E+00 | 0.0000E+00 | 0.0000E+00 |
| S7 | −1.7959E−01 | 1.1341E+00 | −1.6609E+01 | 1.0965E+02 | −4.2738E+02 | 8.7794E+02 | −7.6680E+02 |
| S8 | −4.2467E+00 | 3.2743E+01 | −1.7364E+02 | 5.9497E+02 | −1.2879E+03 | 1.5918E+03 | −8.5543E+02 |
| S9 | −3.3380E+00 | 2.6528E+01 | −1.2789E+02 | 3.9138E+02 | −7.4230E+02 | 7.9541E+02 | −3.6339E+02 |
| S10 | −4.8963E−01 | 3.0508E+00 | −7.4645E+00 | 5.4586E+00 | 1.4782E+01 | −3.4646E+01 | 2.2041E+01 |
| S11 | −4.1119E−02 | 2.2275E−01 | −5.6075E−01 | 1.5440E−01 | 0.0000E+00 | 0.0000E+00 | 0.0000E+00 |
| S12 | −1.6162E−01 | 2.9651E−01 | 1.9851E−01 | −7.6954E−01 | 5.9158E−01 | −1.2622E−01 | −1.4842E−02 |
| S13 | −7.7326E−01 | 5.7914E−01 | 3.4397E−01 | −1.1324E+00 | 1.1888E+00 | −5.9218E−01 | 1.1225E−01 |
| S14 | −7.5163E−01 | 8.5817E−01 | −8.8431E−01 | 6.3260E−01 | −2.9622E−01 | 7.9495E−02 | −9.3032E−03 |

Table 12 shows effective focal lengths f1 to f7 of respective lens, a total effective focal length f of the optical imaging lens assembly, a total optical length TTL (i.e., the distance along the optical axis from the object-side surface S1 of the first lens E1 to the imaging plane S17), half of a diagonal length ImgH of an effective pixel area on the imaging plane S17, half of a maximal field-of-view semi-FOV, and an aperture number f/EPD in example 4.

TABLE 12

| | |
|---|---|
| f1 (mm) | −3.86 |
| f2 (mm) | −6.32 |
| f3 (mm) | 3.85 |
| f4 (mm) | 2.12 |
| f5 (mm) | −8.39 |
| f6 (mm) | 6.75 |
| f7 (mm) | −4.16 |
| f (mm) | 1.56 |
| TTL (mm) | 7.50 |
| ImgH (mm) | 2.12 |
| semi-FOV (°) | 77.5 |
| f/EPD | 2.60 |

Figure 8A:
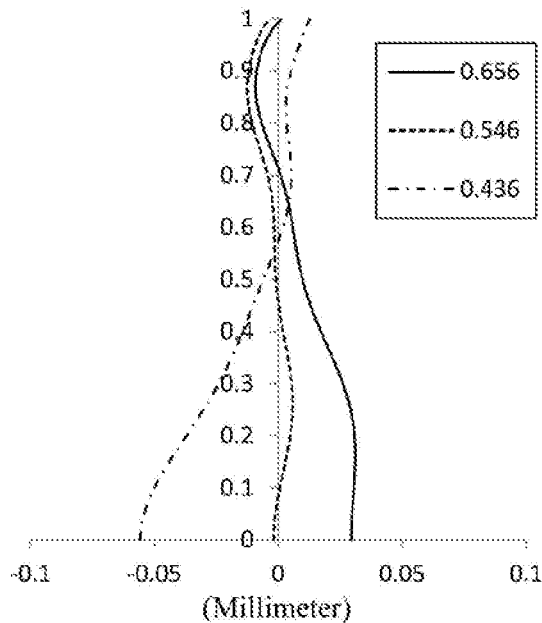
FIGS. 8A to 8D illustrate a longitudinal aberration curve, an astigmatic curve, a distortion curve, and a lateral color curve of the optical imaging lens assembly of the example 4, respectively.
Figure 8B:
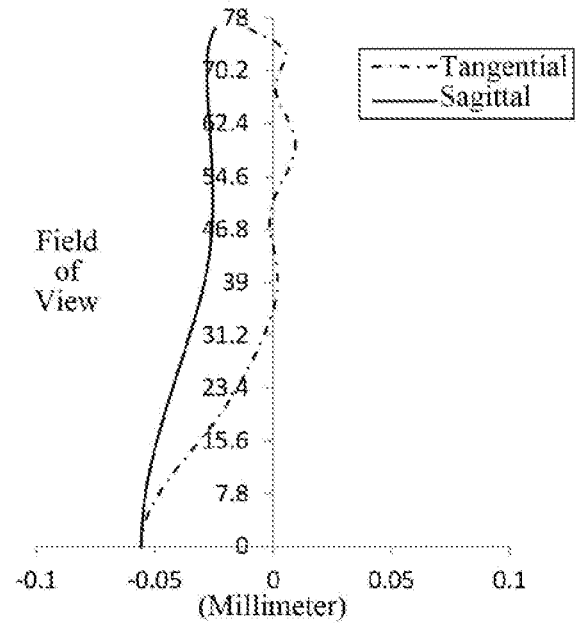
Figure 8C:
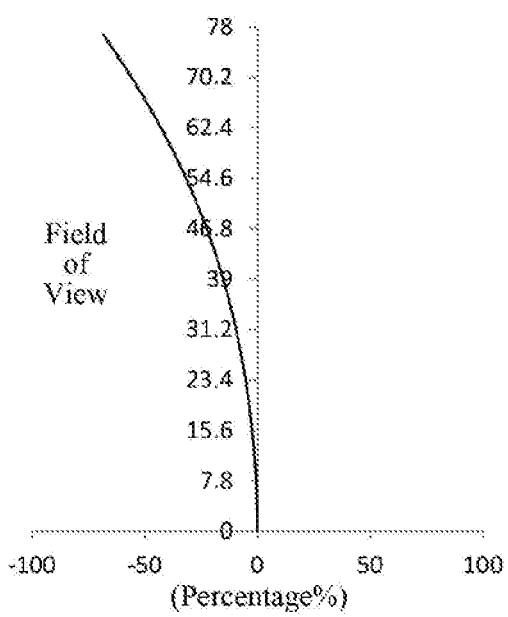
Figure 8D:
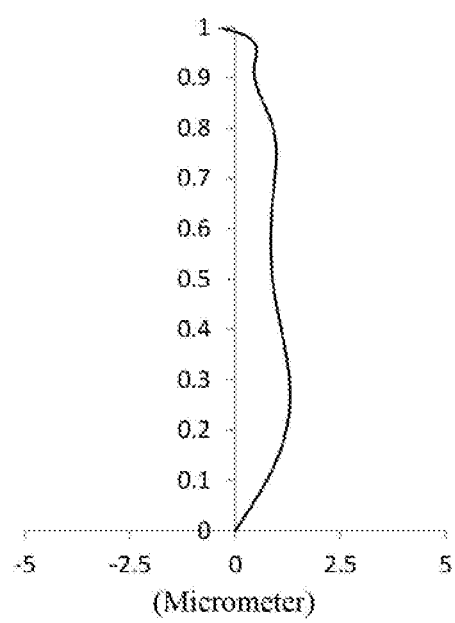

FIG. 8A illustrates a longitudinal aberration curve of the optical imaging lens assembly according to example 4, representing deviations of focal points converged by light of different wavelengths after passing through the lens assembly. FIG. 8B illustrates an astigmatic curve of the optical imaging lens assembly according to example 4, representing a curvature of a tangential plane and a curvature of a sagittal plane. FIG. 8C illustrates a distortion curve of the optical imaging lens assembly according to example 4, representing amounts of distortion corresponding to different field-of-views. FIG. 8D illustrates a lateral color curve of the optical imaging lens assembly according to example 4, representing deviations of different image heights on an imaging plane after light passes through the lens assembly. It can be seen from FIG. 8A to FIG. 8D that the optical imaging lens assembly provided in example 4 may achieve good image quality.

Example 5

Figure 9:
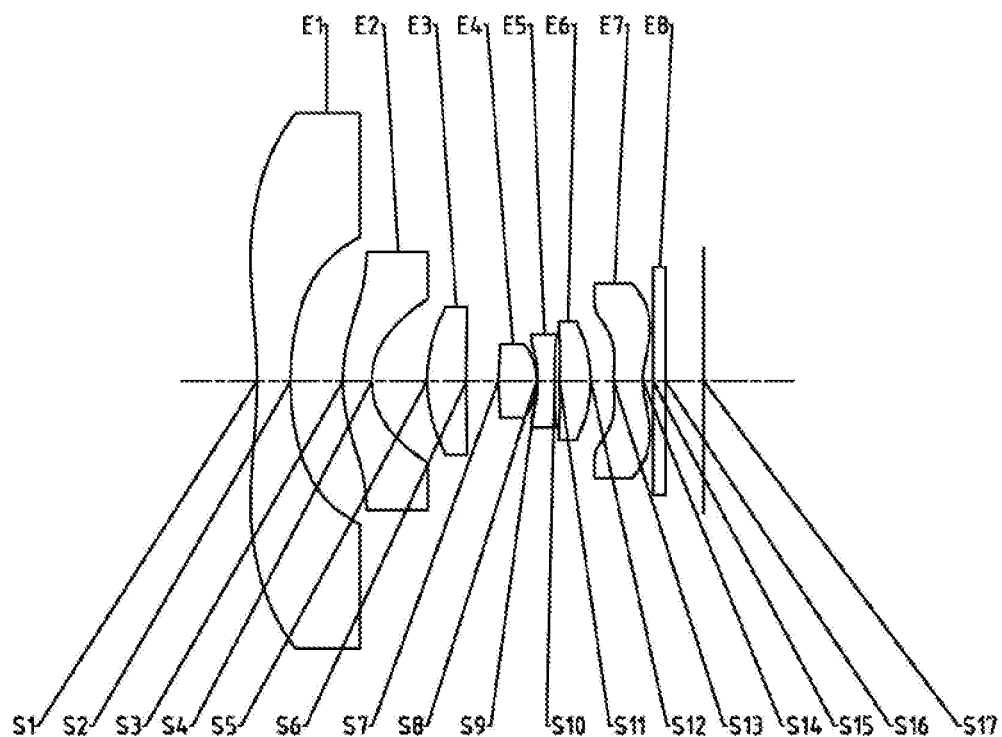
FIG. 9 illustrates a schematic structural view of an optical imaging lens assembly according to example 5 of the present disclosure.

An optical imaging lens assembly according to example 5 of the present disclosure is described below with reference to FIG. 9 to FIG. 10D. FIG. 9 shows a schematic structural view of the optical imaging lens assembly according to example 5 of the present disclosure.

As shown in FIG. 9, the optical imaging lens assembly according to an exemplary embodiment of the present disclosure includes a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has negative refractive power, an object-side surface S1 thereof is a concave surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a concave surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a convex surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Optionally, a stop STO may be disposed between the third lens E3 and the fourth lens E4 to further improve the image quality.

Table 13 shows surface type, radius of curvature, thickness, material and conic coefficient of each lens of the optical imaging lens assembly in example 5, wherein the units for the radius of curvature and the thickness are millimeter (mm).

TABLE 13

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| S1 | Aspheric | −8.8246 | 0.5594 | 1.54 | 55.7 | 0.0000 |
| S2 | Aspheric | 4.6715 | 0.8841 | | | −2.5296 |
| S3 | Aspheric | 3.0948 | 0.4826 | 1.54 | 55.7 | −0.3074 |
| S4 | Aspheric | 1.2965 | 0.9302 | | | −0.3056 |
| S5 | Spherical | 2.6202 | 0.6590 | 1.73 | 28.3 | 0.0000 |
| S6 | Spherical | 81.2512 | 0.5530 | | | 0.0000 |
| STO | Spherical | Infinite | −0.0132 | | | |
| S7 | Aspheric | 2.9314 | 0.6340 | 1.55 | 56.1 | −116.8603 |
| S8 | Aspheric | −1.7694 | 0.0250 | | | 4.6953 |
| S9 | Aspheric | −3.6954 | 0.2804 | 1.68 | 19.2 | 25.9201 |
| S10 | Aspheric | 2132.7484 | 0.0861 | | | −292508180.9912 |
| S11 | Aspheric | 21.7007 | 0.5189 | 1.55 | 56.1 | −55.7896 |
| S12 | Aspheric | −2.9277 | 0.3851 | | | 6.9164 |
| S13 | Aspheric | 2.5910 | 0.4886 | 1.54 | 55.7 | −32.8482 |
| S14 | Aspheric | 1.1133 | 0.1768 | | | −0.5635 |
| S15 | Spherical | Infinite | 0.2100 | 1.52 | 64.2 | |
| S16 | Spherical | Infinite | 0.6400 | | | |
| S17 | Spherical | Infinite | | | | |

As can be seen from Table 13, in example 5, the object-side surface and the image-side surface of each of the first lens E1, the second lens E2, the fourth lens E4, the fifth lens E5, the sixth lens E6, and the seventh lens E7 are aspheric; and the object-side surface and the image-side surface of the third lens E3 are spherical. Table 14 shows high-order coefficients applicable to each aspheric surface in example 5, wherein the surface shape of each aspheric surface may be defined by the formula (1) given in the above example 1.

TABLE 14

| Surface number | A4 | A6 | A8 | A10 | A12 | A14 | A16 |
|---|---|---|---|---|---|---|---|
| S1 | 9.2455E−03 | −4.2726E−04 | 1.2424E−05 | −1.2436E−07 | 0.0000E+00 | 0.0000E+00 | 0.0000E+00 |
| S2 | 7.4171E−03 | 5.9192E−04 | 2.1472E−04 | 0.0000E+00 | 0.0000E+00 | 0.0000E+00 | 0.0000E+00 |
| S3 | 2.1867E−02 | −2.3073E−02 | 4.1783E−03 | −2.4493E−04 | 0.0000E+00 | 0.0000E+00 | 0.0000E+00 |
| S4 | 6.0656E−02 | −8.8396E−03 | −2.7434E−02 | 6.2037E−03 | 0.0000E+00 | 0.0000E+00 | 0.0000E+00 |
| S7 | 3.5705E−01 | −2.1827E+00 | −1.3342E−01 | 5.1454E+01 | −3.1319E+02 | 7.9124E+02 | −7.9325E+02 |
| S8 | −2.0007E+00 | 1.2949E+01 | −5.7566E+01 | 1.6875E+02 | −3.0771E+02 | 3.0630E+02 | −1.2217E+02 |
| S9 | −1.5014E+00 | 9.8808E+00 | −3.9492E+01 | 1.0515E+02 | −1.6583E+02 | 1.2648E+02 | −2.1007E+01 |
| S10 | 2.0842E−01 | −8.1160E−01 | 2.4330E+00 | −4.1236E+00 | 4.9232E+00 | −4.4588E+00 | 2.1088E+00 |
| S11 | 1.4314E−01 | −7.4937E−01 | 8.6965E−01 | −2.9651E−01 | 0.0000E+00 | 0.0000E+00 | 0.0000E+00 |
| S12 | −1.6345E−01 | 3.7055E−01 | −4.6355E−01 | 8.2606E−03 | 6.1551E−01 | −5.4291E−01 | 2.1657E−01 |
| S13 | −5.3281E−01 | 7.0126E−02 | 9.3920E−01 | −1.7969E+00 | 1.5185E+00 | −5.9527E−01 | 8.8217E−02 |
| S14 | −7.6585E−01 | 8.0403E−01 | −7.1494E−01 | 4.3126E−01 | −1.6901E−01 | 3.8026E−02 | −3.7504E−03 |

Table 15 shows effective focal lengths f1 to f7 of respective lens, a total effective focal length f of the optical imaging lens assembly, a total optical length TTL (i.e., the distance along the optical axis from the object-side surface S1 of the first lens E1 to the imaging plane S17), half of a diagonal length ImgH of an effective pixel area on the imaging plane S17, half of a maximal field-of-view semi-FOV, and an aperture number f/EPD in example 5.

TABLE 15

| | |
|---|---|
| f1 (mm) | −5.60 |
| f2 (mm) | −4.58 |
| f3 (mm) | 3.67 |
| f4 (mm) | 2.12 |
| f5 (mm) | −5.43 |
| f6 (mm) | 4.76 |
| f7 (mm) | −4.11 |
| f (mm) | 1.63 |
| TTL (mm) | 7.50 |
| ImgH (mm) | 2.21 |
| semi-FOV (°) | 77.0 |
| f/EPD | 2.60 |

Figures 10A, 10B:
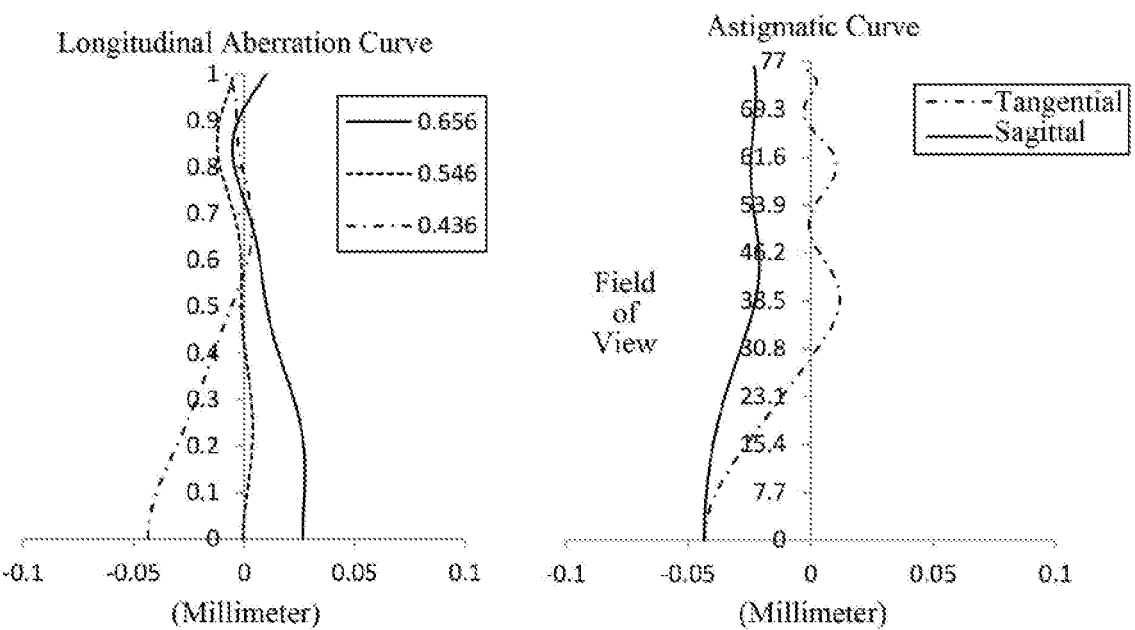

FIG. 10A illustrates a longitudinal aberration curve of the optical imaging lens assembly according to example 5, representing deviations of focal points converged by light of different wavelengths after passing through the lens assembly. FIG. 10B illustrates an astigmatic curve of the optical imaging lens assembly according to example 5, representing a curvature of a tangential plane and a curvature of a sagittal plane. FIG. 10C illustrates a distortion curve of the optical imaging lens assembly according to example 5, representing amounts of distortion corresponding to different field-of-views. FIG. 10D illustrates a lateral color curve of the optical imaging lens assembly according to example 5, representing deviations of different image heights on an imaging plane after light passes through the lens assembly. It can be seen from FIG. 10A to FIG. 10D that the optical imaging lens assembly provided in example 5 may achieve good image quality.

Example 6

An optical imaging lens assembly according to example 6 of the present disclosure is described below with reference to FIG. 11 to FIG. 12D. FIG. 11 shows a schematic structural view of the optical imaging lens assembly according to example 6 of the present disclosure.

As shown in FIG. 11, the optical imaging lens assembly according to an exemplary embodiment of the present disclosure includes a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has negative refractive power, an object-side surface S1 thereof is a concave surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a concave surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Optionally, a stop STO may be disposed between the third lens E3 and the fourth lens E4 to further improve the image quality.

Table 16 shows surface type, radius of curvature, thickness, material and conic coefficient of each lens of the optical imaging lens assembly in example 6, wherein the units for the radius of curvature and the thickness are millimeter (mm).

TABLE 16

| | | | | Material | | |
|---|---|---|---|---|---|---|
| Surface number | Surface type | Radius of curvature | Thickness | Refractive index | Abbe number | Conic coefficient |
| OBJ | Spherical | Infinite | Infinite | | | |
| S1 | Aspheric | −9.3249 | 0.6718 | 1.54 | 55.7 | 0.0000 |
| S2 | Aspheric | 2.1752 | 0.6430 | | | −1.2833 |
| S3 | Aspheric | 1.8885 | 0.4500 | 1.54 | 55.7 | −2.3091 |
| S4 | Aspheric | 1.2926 | 0.5028 | | | 0.2932 |
| S5 | Spherical | 6.5593 | 1.2460 | 1.73 | 28.3 | 0.0000 |
| S6 | Spherical | −4.9704 | 0.2477 | | | 0.0000 |
| STO | Spherical | Infinite | 0.0000 | | | |
| S7 | Aspheric | 2.2872 | 0.5876 | 1.55 | 56.1 | −0.0289 |
| S8 | Aspheric | −2.2694 | 0.0250 | | | 3.3212 |
| S9 | Aspheric | −3.6358 | 0.2800 | 1.68 | 19.2 | 19.8980 |
| S10 | Aspheric | 4.8790 | 0.0856 | | | 4.1924 |
| S11 | Aspheric | 5.1891 | 0.6138 | 1.55 | 56.1 | −48.5457 |
| S12 | Aspheric | −2.0660 | 0.7725 | | | 2.0018 |
| S13 | Aspheric | −100.0000 | 0.4000 | 1.54 | 55.7 | −33.1580 |
| S14 | Aspheric | 1.9974 | 0.1242 | | | −0.2555 |
| S15 | Spherical | Infinite | 0.2100 | 1.52 | 64.2 | |
| S16 | Spherical | Infinite | 0.6402 | | | |
| S17 | Spherical | Infinite | | | | |

As can be seen from Table 16, in example 6, the object-side surface and the image-side surface of each of the first lens E1, the second lens E2, the fourth lens E4, the fifth lens E5, the sixth lens E6, and the seventh lens E7 are aspheric; and the object-side surface and the image-side surface of the third lens E3 are spherical. Table 17 shows high-order coefficients applicable to each aspheric surface in example 6, wherein the surface shape of each aspheric surface may be defined by the formula (1) given in the above example 1.

TABLE 17

| Surface number | A4 | A6 | A8 | A10 | A12 | A14 | A16 |
|---|---|---|---|---|---|---|---|
| S1 | 1.2765E−02 | −7.5649E−04 | 2.8993E−05 | −3.0561E−07 | 0.0000E+00 | 0.0000E+00 | 0.0000E+00 |
| S2 | 1.3248E−02 | −4.8243E−03 | 4.3907E−03 | 0.0000E+00 | 0.0000E+00 | 0.0000E+00 | 0.0000E+00 |
| S3 | 3.0004E−02 | −9.0666E−02 | 3.4451E−02 | −3.9945E−03 | 0.0000E+00 | 0.0000E+00 | 0.0000E+00 |
| S4 | 3.4635E−02 | −1.2704E−01 | 4.1460E−02 | −1.9658E−02 | 0.0000E+00 | 0.0000E+00 | 0.0000E+00 |
| S7 | 1.6717E−02 | 3.8070E−01 | −3.2386E+00 | 1.5115E+01 | −3.8207E+01 | 4.7946E+01 | −2.2687E+01 |
| S8 | 3.7694E−01 | −5.4914E+00 | 3.0702E+01 | −9.3155E+01 | 1.6107E+02 | −1.5011E+02 | 5.9948E+01 |
| S9 | 4.0247E−01 | −5.5771E+00 | 2.8957E+01 | −8.1523E+01 | 1.3205E+02 | −1.1721E+02 | 4.6773E+01 |
| S10 | 2.2823E−01 | −2.0484E+00 | 7.1839E+00 | −1.4092E+01 | 1.7020E+01 | −1.2118E+01 | 3.9290E+00 |
| S11 | 9.3377E−02 | −7.6165E−01 | 1.2992E+00 | −6.8153E−01 | 0.0000E+00 | 0.0000E+00 | 0.0000E+00 |
| S12 | −1.2210E−01 | 3.8703E−02 | −1.9891E−01 | 5.6908E−01 | −9.5327E−01 | 9.6820E−01 | −3.6890E−01 |
| S13 | −3.3065E−01 | 2.9771E−02 | 2.2163E−01 | −3.5123E−01 | 2.2888E−01 | −5.5667E−02 | 2.4760E−03 |
| S14 | −3.4021E−01 | 2.4559E−01 | −1.6547E−01 | 7.6608E−02 | −2.3050E−02 | 3.9584E−03 | −2.8031E−04 |

Table 18 shows effective focal lengths f1 to f7 of respective lens, a total effective focal length f of the optical imaging lens assembly, a total optical length TTL (i.e., the distance along the optical axis from the object-side surface S1 of the first lens E1 to the imaging plane S17), half of a diagonal length ImgH of an effective pixel area on the imaging plane S17, half of a maximal field-of-view semi-FOV, and an aperture number f/EPD in example 6.

TABLE 18

| f1 (mm) | −3.22 |
|---|---|
| f2 (mm) | −10.36 |
| f3 (mm) | 4.04 |
| f4 (mm) | 2.18 |
| f5 (mm) | −3.03 |
| f6 (mm) | 2.79 |
| f7 (mm) | −3.64 |
| f (mm) | 1.76 |
| TTL (mm) | 7.50 |
| ImgH (mm) | 2.39 |
| semi-FOV (°) | 77.5 |
| f/EPD | 2.60 |

Figure 12A:
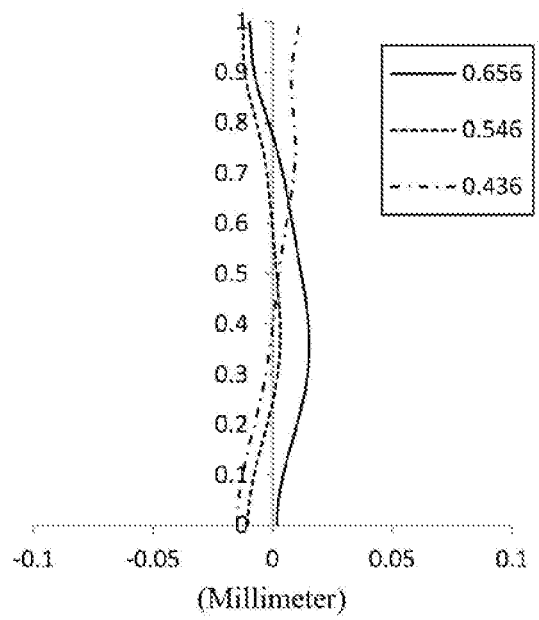
FIGS. 12A to 12D illustrate a longitudinal aberration curve, an astigmatic curve, a distortion curve, and a lateral color curve of the optical imaging lens assembly of the example 6, respectively.
Figure 12B:
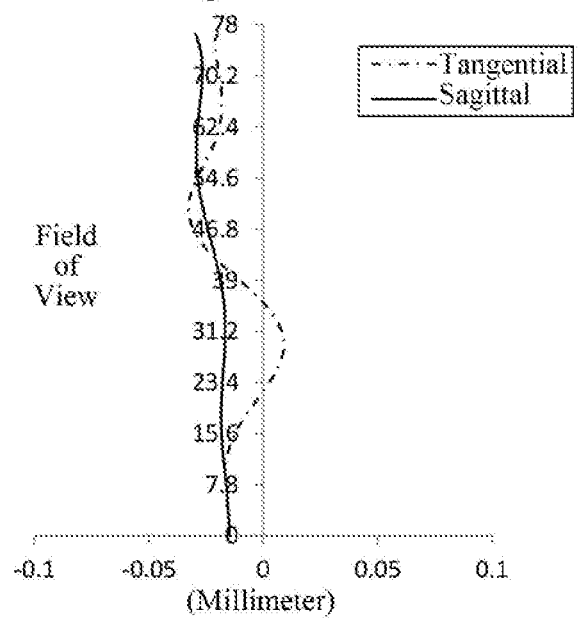
Figure 12C:
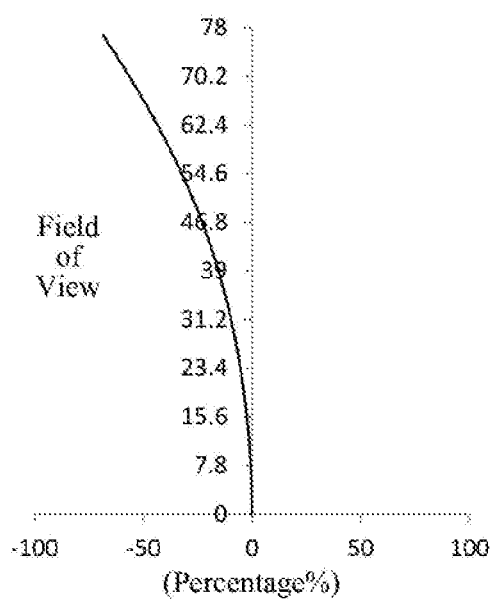
Figure 12D:
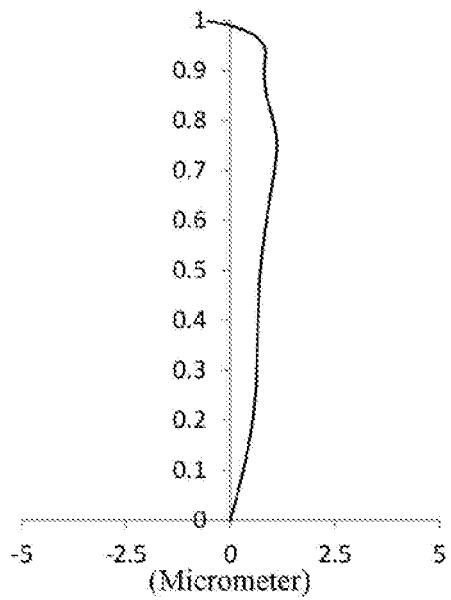

FIG. 12A illustrates a longitudinal aberration curve of the optical imaging lens assembly according to example 6, representing deviations of focal points converged by light of different wavelengths after passing through the lens assembly. FIG. 12B illustrates an astigmatic curve of the optical imaging lens assembly according to example 6, representing a curvature of a tangential plane and a curvature of a sagittal plane. FIG. 12C illustrates a distortion curve of the optical imaging lens assembly according to example 6, representing amounts of distortion corresponding to different field-of-views. FIG. 12D illustrates a lateral color curve of the optical imaging lens assembly according to example 6, representing deviations of different image heights on an imaging plane after light passes through the lens assembly. It can be seen from FIG. 12A to FIG. 12D that the optical imaging lens assembly provided in example 6 may achieve good image quality.

Example 7

Figure 13:
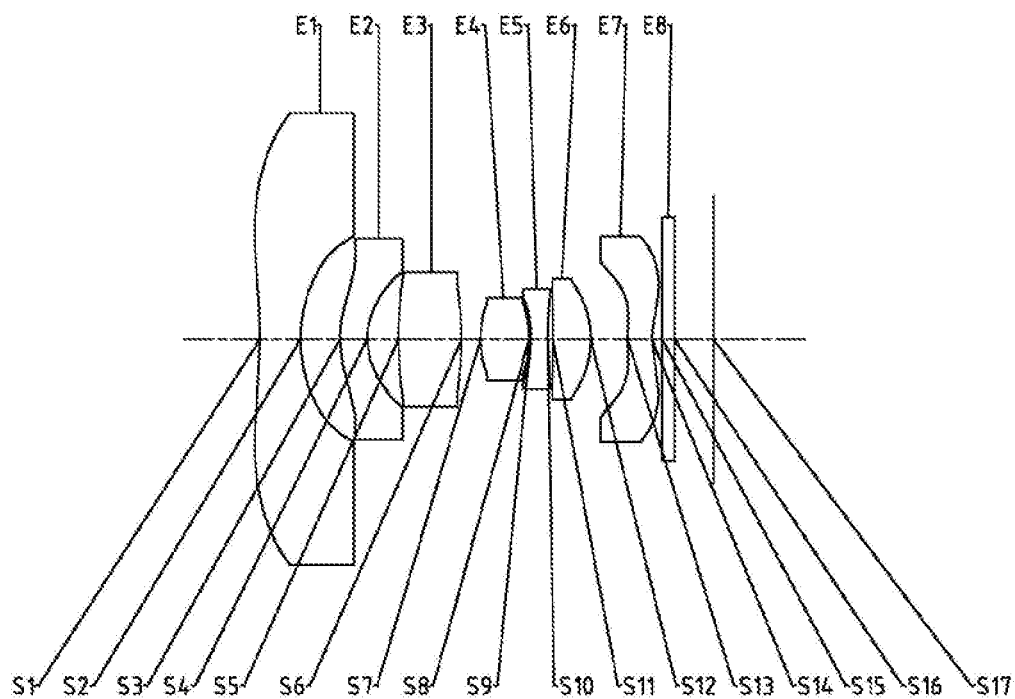
FIG. 13 illustrates a schematic structural view of an optical imaging lens assembly according to example 7 of the present disclosure.

An optical imaging lens assembly according to example 7 of the present disclosure is described below with reference to FIG. 13 to FIG. 14D. FIG. 13 shows a schematic structural view of the optical imaging lens assembly according to example 7 of the present disclosure.

As shown in FIG. 13, the optical imaging lens assembly according to an exemplary embodiment of the present disclosure includes a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has negative refractive power, an object-side surface S1 thereof is a concave surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a concave surface, and an image-side surface S10 thereof is a concave surface. The sixth lens E6 has positive refractive power, an object-side surface S11 thereof is a concave surface, and an image-side surface S12 thereof is a convex surface. The seventh lens E7 has negative refractive power, an object-side surface S13 thereof is a convex surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Optionally, a stop STO may be disposed between the third lens E3 and the fourth lens E4 to further improve the image quality.

Table 19 shows surface type, radius of curvature, thickness, material and conic coefficient of each lens of the optical imaging lens assembly in example 7, wherein the units for the radius of curvature and the thickness are millimeter (mm).

TABLE 19

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| S1 | Aspheric | −8.2647 | 0.6693 | 1.54 | 55.7 | 0.0000 |
| S2 | Aspheric | 2.4449 | 0.6530 | | | −1.1972 |
| S3 | Aspheric | 2.0365 | 0.4500 | 1.54 | 55.7 | −2.7950 |
| S4 | Aspheric | 1.2899 | 0.5166 | | | 0.1434 |
| S5 | Spherical | 6.9926 | 1.0439 | 1.73 | 28.3 | 0.0000 |
| S6 | Spherical | −5.5401 | 0.4015 | | | 0.0000 |
| STO | Spherical | Infinite | −0.0863 | | | 0.0000 |
| S7 | Aspheric | 1.9012 | 0.8030 | 1.55 | 56.1 | 0.5491 |
| S8 | Aspheric | −2.1955 | 0.0250 | | | 3.1393 |
| S9 | Aspheric | −3.6525 | 0.2800 | 1.68 | 19.2 | 21.8548 |
| S10 | Aspheric | 7.3254 | 0.0890 | | | 4.1924 |
| S11 | Aspheric | −55.0000 | 0.6246 | 1.55 | 56.1 | 0.0000 |
| S12 | Aspheric | −1.8506 | 0.6100 | | | 1.7189 |
| S13 | Aspheric | 3.2578 | 0.4000 | 1.54 | 55.7 | −33.1580 |
| S14 | Aspheric | 1.2239 | 0.1704 | | | −0.5383 |
| S15 | Spherical | Infinite | 0.2100 | 1.52 | 64.2 | |
| S16 | Spherical | Infinite | 0.6398 | | | |
| S17 | Spherical | Infinite | | | | |

As can be seen from Table 19, in example 7, the object-side surface and the image-side surface of each of the first lens E1, the second lens E2, the fourth lens E4, the fifth lens E5, the sixth lens E6, and the seventh lens E7 are aspheric; and the object-side surface and the image-side surface of the third lens E3 are spherical. Table 20 shows high-order coefficients applicable to each aspheric surface in example 7, wherein the surface shape of each aspheric surface may be defined by the formula (1) given in the above example 1.

TABLE 20

| Surface number | A4 | A6 | A8 | A10 | A12 | A14 | A16 |
|---|---|---|---|---|---|---|---|
| S1 | 1.2534E−02 | −6.8478E−04 | 2.3316E−05 | −1.6079E−07 | 0.0000E+00 | 0.0000E+00 | 0.0000E+00 |
| S2 | 1.5067E−02 | −6.0385E−03 | 4.3594E−03 | 0.0000E+00 | 0.0000E+00 | 0.0000E+00 | 0.0000E+00 |
| S3 | 4.0829E−02 | −9.1104E−02 | 3.2571E−02 | −3.6301E−03 | 0.0000E+00 | 0.0000E+00 | 0.0000E+00 |
| S4 | 3.7104E−02 | −1.0434E−01 | −6.2803E−03 | 9.7295E−03 | 0.0000E+00 | 0.0000E+00 | 0.0000E+00 |
| S7 | 1.7446E−02 | 4.5772E−01 | −3.4324E+00 | 1.5861E+01 | −4.1410E+01 | 5.7525E+01 | −3.3235E+01 |
| S8 | −3.1931E−01 | 1.5510E+00 | −1.9976E+00 | −1.0518E+01 | 5.1509E+01 | −8.9719E+01 | 6.0355E+01 |
| S9 | −3.8920E−01 | 1.2804E+00 | −1.2398E+00 | −1.2573E+01 | 5.7217E+01 | −9.9917E+01 | 6.8706E+01 |
| S10 | 7.8642E−04 | −3.5204E−02 | 4.6650E−01 | −2.0946E+00 | 4.2248E+00 | −4.1425E+00 | 1.6548E+00 |
| S11 | 0.0000E+00 | 0.0000E+00 | 0.0000E+00 | 0.0000E+00 | 0.0000E+00 | 0.0000E+00 | 0.0000E+00 |
| S12 | −8.6079E−02 | 1.0555E−01 | 8.7630E−04 | −7.4505E−02 | 1.3436E−01 | −4.4463E−02 | 8.5132E−03 |
| S13 | −4.7936E−01 | 8.1255E−02 | 4.2206E−01 | −6.6867E−01 | 4.9581E−01 | −1.8435E−01 | 2.7907E−02 |
| S14 | −6.3246E−01 | 5.6769E−01 | −4.3329E−01 | 2.2747E−01 | −7.7943E−02 | 1.5398E−02 | −1.3404E−03 |

Table 21 shows effective focal lengths f1 to f7 of respective lens, a total effective focal length f of the optical imaging lens assembly, a total optical length TTL (i.e., the distance along the optical axis from the object-side surface S1 of the first lens E1 to the imaging plane S17), half of a diagonal length ImgH of an effective pixel area on the imaging plane S17, half of a maximal field-of-view semi-FOV, and an aperture number f/EPD in example 7.

TABLE 21

| | |
|---|---|
| f1 (mm) | −3.44 |
| f2 (mm) | −8.30 |
| f3 (mm) | 4.36 |
| f4 (mm) | 2.00 |
| f5 (mm) | −3.55 |
| f6 (mm) | 3.49 |
| f7 (mm) | −3.92 |
| f (mm) | 1.75 |

TABLE 21-continued

| | |
|---|---|
| TTL (mm) | 7.50 |
| ImgH (mm) | 2.39 |
| semi-FOV (°) | 77.5 |
| f/EPD | 2.60 |

Figures 14A, 14B:
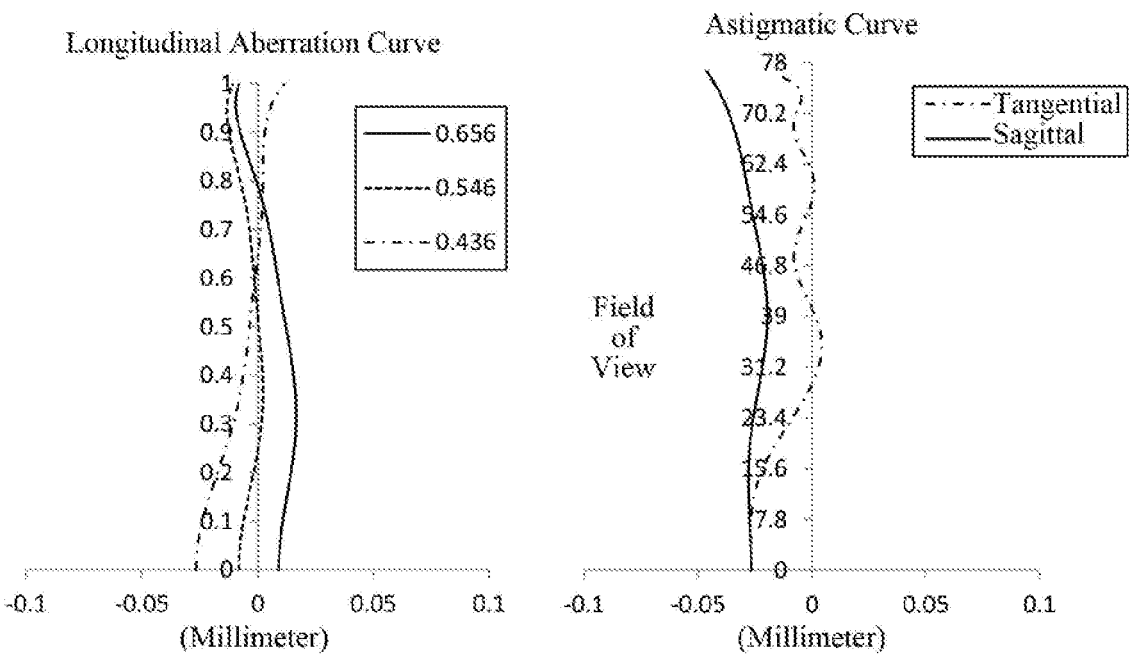

FIG. 14A illustrates a longitudinal aberration curve of the optical imaging lens assembly according to example 7, representing deviations of focal points converged by light of different wavelengths after passing through the lens assembly. FIG. 14B illustrates an astigmatic curve of the optical imaging lens assembly according to example 7, representing a curvature of a tangential plane and a curvature of a sagittal plane. FIG. 14C illustrates a distortion curve of the optical imaging lens assembly according to example 7, representing amounts of distortion corresponding to different field-of-views. FIG. 14D illustrates a lateral color curve of the optical imaging lens assembly according to example 7, representing deviations of different image heights on an imaging plane after light passes through the lens assembly. It can be seen from FIG. 14A to FIG. 14D that the optical imaging lens assembly provided in example 7 may achieve good image quality.

Example 8

An optical imaging lens assembly according to example 8 of the present disclosure is described below with reference to FIG. 15 to FIG. 16D. FIG. 15 shows a schematic structural view of the optical imaging lens assembly according to example 8 of the present disclosure.

As shown in FIG. 15, the optical imaging lens assembly according to an exemplary embodiment of the present disclosure includes a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has negative refractive power, an object-side surface S1 thereof is a concave surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has positive refractive power, an object-side surface S7 thereof is a convex surface, and an image-side surface S8 thereof is a concave surface. The fifth lens E5 has negative refractive power, an object-side surface S9 thereof is a concave surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a convex surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Optionally, a stop STO may be disposed between the third lens E3 and the fourth lens E4 to further improve the image quality.

Table 22 shows surface type, radius of curvature, thickness, material and conic coefficient of each lens of the optical imaging lens assembly in example 8, wherein the units for the radius of curvature and the thickness are millimeter (mm).

TABLE 22

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| S1 | Aspheric | −6.0054 | 0.6312 | 1.54 | 55.7 | 0.0000 |
| S2 | Aspheric | 4.7388 | 0.5912 | | | −0.1820 |
| S3 | Aspheric | 3.5176 | 0.4500 | 1.54 | 55.7 | −2.4305 |
| S4 | Aspheric | 1.5409 | 0.5977 | | | 0.4888 |
| S5 | Spherical | 8.0015 | 1.1189 | 1.73 | 28.3 | 0.0000 |
| S6 | Spherical | −4.3822 | 0.5256 | | | 0.0000 |
| STO | Spherical | Infinite | −0.1091 | | | |
| S7 | Aspheric | 1.8131 | 0.4447 | 1.55 | 56.1 | 1.7335 |
| S8 | Aspheric | 266.0608 | 0.0977 | | | 0.0000 |
| S9 | Aspheric | −5.8392 | 0.2800 | 1.68 | 19.2 | 68.3632 |
| S10 | Aspheric | 3.7530 | 0.0254 | | | −1.8319 |
| S11 | Aspheric | 4.6262 | 0.5592 | 1.55 | 56.1 | −49.7490 |
| S12 | Aspheric | −1.6650 | 0.8514 | | | 1.6447 |
| S13 | Aspheric | 2.4334 | 0.4009 | 1.54 | 55.7 | −32.6396 |
| S14 | Aspheric | 1.2895 | 0.1852 | | | −0.4699 |
| S15 | Spherical | Infinite | 0.2100 | 1.52 | 64.2 | |
| S16 | Spherical | Infinite | 0.6400 | | | |
| S17 | Spherical | Infinite | | | | |

As can be seen from Table 22, in example 8, the object-side surface and the image-side surface of each of the first lens E1, the second lens E2, the fourth lens E4, the fifth lens E5, the sixth lens E6, and the seventh lens E7 are aspheric; and the object-side surface and the image-side surface of the third lens E3 are spherical. Table 23 shows high-order coefficients applicable to each aspheric surface in example 8, wherein the surface shape of each aspheric surface may be defined by the formula (1) given in the above example 1.

TABLE 23

| Surface number | A4 | A6 | A8 | A10 | A12 | A14 | A16 |
|---|---|---|---|---|---|---|---|
| S1 | 1.3879E−02 | −6.8163E−04 | 2.1397E−05 | −1.3057E−07 | 0.0000E+00 | 0.0000E+00 | 0.0000E+00 |
| S2 | 1.3975E−02 | −2.4617E−03 | 1.4237E−03 | 0.0000E+00 | 0.0000E+00 | 0.0000E+00 | 0.0000E+00 |
| S3 | 5.2760E−02 | −6.3793E−02 | 1.7461E−02 | −1.5230E−03 | 0.0000E+00 | 0.0000E+00 | 0.0000E+00 |
| S4 | 8.3090E−02 | −9.5054E−02 | 2.1075E−02 | −8.6278E−03 | 0.0000E+00 | 0.0000E+00 | 0.0000E+00 |
| S7 | −1.3461E−03 | 6.1704E−01 | −3.9192E+00 | 1.7123E+01 | −4.2947E+01 | 6.2109E+01 | −3.9174E+01 |
| S8 | −1.5385E−01 | 0.0000E+00 | 0.0000E+00 | 0.0000E+00 | 0.0000E+00 | 0.0000E+00 | 0.0000E+00 |
| S9 | −2.8048E−01 | −1.0158E−01 | 1.7320E+00 | −1.7176E+01 | 6.5069E+01 | −1.1950E+02 | 8.4407E+01 |
| S10 | −5.6101E−01 | 1.9048E+00 | −2.3874E+00 | −3.1905E+00 | 1.4332E+01 | −1.9685E+01 | 1.0130E+01 |
| S11 | −6.5796E−01 | 2.2510E+00 | −3.1036E+00 | 1.6776E+00 | 0.0000E+00 | 0.0000E+00 | 0.0000E+00 |
| S12 | −1.1873E−01 | 2.8185E−01 | −7.1239E−01 | 2.4584E+00 | −4.5098E+00 | 4.7570E+00 | −1.7739E+00 |

TABLE 23-continued

| Surface number | A4 | A6 | A8 | A10 | A12 | A14 | A16 |
|---|---|---|---|---|---|---|---|
| S13 | −2.2154E−01 | −1.8372E−01 | 2.2749E−01 | 9.5990E−02 | −2.7759E−01 | 1.5914E−01 | −2.9379E−02 |
| S14 | −4.7419E−01 | 3.1407E−01 | −2.2427E−01 | 1.2938E−01 | −5.1503E−02 | 1.1442E−02 | −1.0748E−03 |

Table 24 shows effective focal lengths f1 to f7 of respective lens, a total effective focal length f of the optical imaging lens assembly, a total optical length TTL (i.e., the distance along the optical axis from the object-side surface S1 of the first lens E1 to the imaging plane S17), half of a diagonal length ImgH of an effective pixel area on the imaging plane S17, half of a maximal field-of-view semi-FOV, and an aperture number f/EPD in example 8.

TABLE 24

| | |
|---|---|
| f1 (mm) | −4.83 |
| f2 (mm) | −5.55 |
| f3 (mm) | 4.01 |
| f4 (mm) | 3.34 |
| f5 (mm) | −3.32 |
| f6 (mm) | 2.31 |
| f7 (mm) | −5.82 |
| f (mm) | 1.75 |
| TTL (mm) | 7.50 |
| ImgH (mm) | 2.37 |
| semi-FOV (°) | 77.5 |
| f/EPD | 2.60 |

Figure 16A:
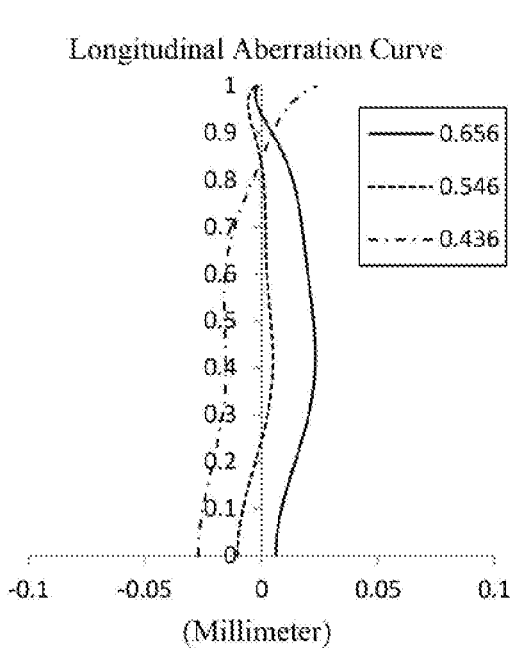
FIGS. 16A to 16D illustrate a longitudinal aberration curve, an astigmatic curve, a distortion curve, and a lateral color curve of the optical imaging lens assembly of the example 8, respectively.
Figure 16B:
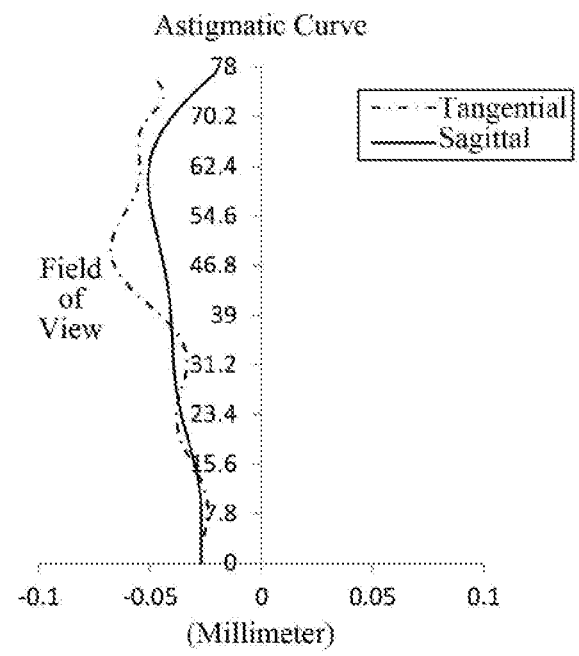
Figure 16C:
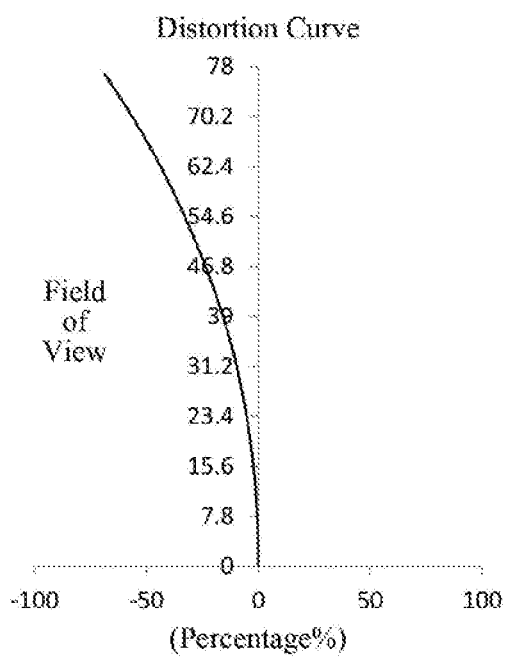
Figure 16D:
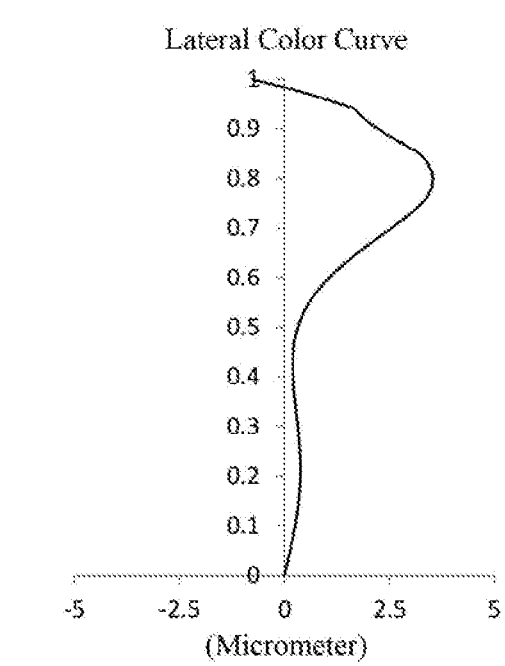

FIG. 16A illustrates a longitudinal aberration curve of the optical imaging lens assembly according to example 8, representing deviations of focal points converged by light of different wavelengths after passing through the lens assembly. FIG. 16B illustrates an astigmatic curve of the optical imaging lens assembly according to example 8, representing a curvature of a tangential plane and a curvature of a sagittal plane. FIG. 16C illustrates a distortion curve of the optical imaging lens assembly according to example 8, representing amounts of distortion corresponding to different field-of-views. FIG. 16D illustrates a lateral color curve of the optical imaging lens assembly according to example 8, representing deviations of different image heights on an imaging plane after light passes through the lens assembly. It can be seen from FIG. 16A to FIG. 16D that the optical imaging lens assembly provided in example 8 may achieve good image quality.

In view of the above, examples 1 to 8 respectively satisfy the relationship shown in Table 25.

The present disclosure further provides a camera apparatus, having an electronic photosensitive element which may be a photosensitive Charge-Coupled Device (CCD) or a Complementary Metal-Oxide Semiconductor (CMOS). The camera apparatus may be an independent camera device such as a digital camera, or may be a camera module integrated in a mobile electronic device such as a mobile phone. The camera apparatus is equipped with the optical imaging lens assembly described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, comprising, sequentially from an object side to an image side along an optical axis, a first lens, a second lens, a third lens, a fourth lens, a fifth lens, a sixth lens and a seventh lens,
wherein,
the first lens has negative refractive power;
the second lens has negative refractive power;
the third lens has positive refractive power;
the fourth lens has positive refractive power;
the fifth lens has negative refractive power, and an object-side surface of the fifth lens is a concave surface;
the sixth lens has refractive power; and
the seventh lens has negative refractive power,
wherein −3.5<f1/f<0, and
0.5<CT3/(CT4+CT6)<1.2,
where f1 is an effective focal length of the first lens, f is a total effective focal length of the optical imaging lens assembly, CT3 is a center thickness of the third lens

TABLE 25

| | Example | | | | | | | |
|---|---|---|---|---|---|---|---|---|
| Condition | 1 | 2 | 3 | 4 | 5 | 6 | 7 | 8 |
| f1/f | −1.94 | −3.33 | −3.17 | −2.48 | −3.43 | −1.83 | −1.96 | −2.76 |
| (R3 + R4)/|f2| | 0.95 | 0.83 | 0.94 | 1.19 | 0.96 | 0.31 | 0.40 | 0.91 |
| f4/f3 | 0.35 | 0.49 | 0.52 | 0.55 | 0.58 | 0.54 | 0.46 | 0.83 |
| f/f456 | 0.74 | 0.76 | 0.78 | 0.73 | 0.75 | 0.80 | 0.80 | 0.71 |
| f/R5 + f/R7 | 1.01 | 1.01 | 1.21 | 1.31 | 1.18 | 1.04 | 1.17 | 1.18 |
| f6/|(R9 + R12)| | 0.52 | 0.32 | 0.64 | 0.54 | 0.72 | 0.49 | 0.63 | 0.31 |
| R14/f7 | −0.25 | −0.27 | −0.27 | −0.30 | −0.27 | −0.55 | −0.31 | −0.22 |
| |R2/R1| | 0.43 | 0.71 | 0.42 | 0.35 | 0.53 | 0.23 | 0.30 | 0.79 |
| T23/f | 0.28 | 0.55 | 0.49 | 0.37 | 0.57 | 0.29 | 0.30 | 0.34 |
| CT3/(CT4 + CT6) | 0.99 | 0.85 | 0.57 | 0.77 | 0.57 | 1.04 | 0.73 | 1.11 |
| (CT1 + CT2 + T23)/(ET1 + ET2) | 0.94 | 0.85 | 0.89 | 0.90 | 0.92 | 1.00 | 0.96 | 0.87 |
| SAG72/SAG71 | 0.39 | 0.54 | 0.64 | 0.85 | 0.55 | 0.52 | 0.41 | 0.43 |
| (semi-FOV − CRA)*TTL/ImgH (rad) | 2.25 | 2.43 | 2.53 | 2.58 | 2.52 | 2.32 | 2.33 | 2.34 | along the optical axis, CT4 is a center thickness of the fourth lens along the optical axis, and CT6 is a center thickness of the sixth lens along the optical axis.

2. The optical imaging lens assembly according to claim 1, wherein $0.2<(R3+R4)/|f2|<1.2$,
where R3 is a radius of curvature of an object-side surface of the second lens, R4 is a radius of curvature of an image-side surface of the second lens, and f2 is an effective focal length of the second lens.

3. The optical imaging lens assembly according to claim 1, wherein $0.3<f4/f3<0.9$,
where f3 is an effective focal length of the third lens, and f4 is an effective focal length of the fourth lens.

4. The optical imaging lens assembly according to claim 1, wherein $0.5<f/f456<1$,
where f is the total effective focal length of the optical imaging lens assembly, and f456 is a combined focal length of the fourth lens, the fifth lens and the sixth lens.

5. The optical imaging lens assembly according to claim 1, wherein $0.9<f/R5+f/R7<1.4$,
where f is the total effective focal length of the optical imaging lens assembly, R5 is a radius of curvature of an object-side surface of the third lens, and R7 is a radius of curvature of an object-side surface of the fourth lens.

6. The optical imaging lens assembly according to claim 1, wherein $0.3<f6/|(R9+R12)|<0.8$,
where f6 is an effective focal length of the sixth lens, R9 is a radius of curvature of the object-side surface of the fifth lens, and R12 is a radius of curvature of an image-side surface of the sixth lens.

7. The optical imaging lens assembly according to claim 1, wherein $-0.6<R14/f7<0$,
where f7 is an effective focal length of the seventh lens, and R14 is a radius of curvature of an image-side surface of the seventh lens.

8. The optical imaging lens assembly according to claim 1, wherein $0.2<|R2/R1|<0.8$,
where R1 is a radius of curvature of an object-side surface of the first lens, and R2 is a radius of curvature of an image-side surface of the first lens.

9. The optical imaging lens assembly according to claim 1, wherein $0<T23/f<1$,
where T23 is a spaced interval between the second lens and the third lens along the optical axis, and f is the total effective focal length of the optical imaging lens assembly.

10. The optical imaging lens assembly according to claim 1, wherein the sixth lens has a positive refractive power.

11. The optical imaging lens assembly according to claim 1, wherein $0.7<(CT1+CT2+T23)/(ET1+ET2)<1.2$,
where CT1 is a center thickness of the first lens along the optical axis, CT2 is a center thickness of the second lens along the optical axis, T23 is a spaced interval between the second lens and the third lens along the optical axis, ET1 is an edge thickness of the first lens, and ET2 is an edge thickness of the second lens.

12. The optical imaging lens assembly according to claim 1, wherein $0<SAG72/SAG71<1$,
where SAG71 is an on-axis distance from an intersection of an object-side surface of the seventh lens and the optical axis to a vertex of an effective half-aperture of the object-side surface of the seventh lens, and SAG72 is an on-axis distance from an intersection of an image-side surface of the seventh lens and the optical axis to a vertex of an effective half-aperture of the image-side surface of the seventh lens.

13. The optical imaging lens assembly according to claim 1, wherein $2.1\ rad<(semi\text{-}FOV-CRA)*TTL/ImgH<2.6\ rad$,
where semi-FOV is half of a maximal field-of-view of the optical imaging lens assembly, CRA is an incident angle of a chief ray on an imaging plane corresponding to half of the maximal field-of-view of the optical imaging lens assembly, TTL is a distance along the optical axis from an object-side surface of the first lens to the imaging plane of the optical imaging lens assembly, and ImgH is half of a diagonal length of an effective pixel area on the imaging plane of the optical imaging lens assembly.

14. An optical imaging lens assembly, comprising, sequentially from an object side to an image side along an optical axis, a first lens, a second lens, a third lens, a fourth lens, a fifth lens, a sixth lens and a seventh lens,
wherein,
the first lens has negative refractive power, and an object-side surface of the first lens is a concave surface;
the second lens has negative refractive power;
the third lens has positive refractive power;
the fourth lens has positive refractive power;
the fifth lens has negative refractive power;
the sixth lens has refractive power; and
the seventh lens has refractive power, and an image-side surface of the seventh lens is a concave surface,
wherein $0.5<f/f456<1$, and
$0.5<CT3/(CT4+CT6)<1.2$,
where f is a total effective focal length of the optical imaging lens assembly, f456 is a combined focal length of the fourth lens, the fifth lens and the sixth lens, CT3 is a center thickness of the third lens along the optical axis, CT4 is a center thickness of the fourth lens along the optical axis, and CT6 is a center thickness of the sixth lens along the optical axis.

15. The optical imaging lens assembly according to claim 14, wherein $-3.5<f1/f<0$,
where f1 is an effective focal length of the first lens, and f is the total effective focal length of the optical imaging lens assembly.

16. The optical imaging lens assembly according to claim 14, wherein $0.9<f/R5+f/R7<1.4$,
where f is the total effective focal length of the optical imaging lens assembly, R5 is a radius of curvature of an object-side surface of the third lens, and R7 is a radius of curvature of an object-side surface of the fourth lens.

17. The optical imaging lens assembly according to claim 14, wherein $0.3<f6/|(R9+R12)|<0.8$,
where f6 is an effective focal length of the sixth lens, R9 is a radius of curvature of an object-side surface of the fifth lens, and R12 is a radius of curvature of an image-side surface of the sixth lens.

18. The optical imaging lens assembly according to claim 14, wherein $0<T23/f<1$,
where T23 is a spaced interval between the second lens and the third lens along the optical axis, and f is the total effective focal length of the optical imaging lens assembly.

19. The optical imaging lens assembly according to claim 14, wherein $0.7<(CT1+CT2+T23)/(ET1+ET2)<1.2$,
where CT1 is a center thickness of the first lens along the optical axis, CT2 is a center thickness of the second lens along the optical axis, T23 is a spaced interval between the second lens and the third lens along the optical axis, ET1 is an edge thickness of the first lens, and ET2 is an edge thickness of the second lens.

20. The optical imaging lens assembly according to claim 14, wherein 2.1 rad<(semi-FOV−CRA)*TTL/ImgH<2.6 rad, where semi-FOV is half of a maximal field-of-view of the optical imaging lens assembly, CRA is an incident angle of a chief ray on an imaging plane corresponding to half of the maximal field-of-view of the optical imaging lens assembly, TTL is a distance along the optical axis from the object-side surface of the first lens to the imaging plane of the optical imaging lens assembly, and ImgH is half of a diagonal length of an effective pixel area on the imaging plane of the optical imaging lens assembly.

* * * * *